US011226618B2

(12) United States Patent
Leger

(10) Patent No.: US 11,226,618 B2
(45) Date of Patent: *Jan. 18, 2022

(54) REMOTELY OPERATED PIPE FITTING SWAGING SYSTEMS AND METHODS

(71) Applicant: Trinity Bay Equipment Holdings, LLC, Houston, TX (US)

(72) Inventor: John Paul Leger, Baytown, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,628

(22) Filed: Feb. 8, 2021

(65) Prior Publication Data
US 2021/0373550 A1 Dec. 2, 2021

Related U.S. Application Data

(63) Continuation of application No. 16/886,496, filed on May 28, 2020, now Pat. No. 10,955,839.

(51) Int. Cl.
*G05D 1/00* (2006.01)
*G05B 19/404* (2006.01)
(Continued)

(52) U.S. Cl.
CPC ......... *G05D 1/0016* (2013.01); *B21D 39/031* (2013.01); *B60D 1/48* (2013.01);
(Continued)

(58) Field of Classification Search
CPC .............. G05D 1/0016; G05B 19/404; G05B 2219/45152; B21D 39/031; B62D 59/02;
(Continued)

(56) References Cited

U.S. PATENT DOCUMENTS 6,412,160 B1 7/2002 Glessner et al.
8,805,592 B1 8/2014 Booth et al.
(Continued)

FOREIGN PATENT DOCUMENTS

WO 2003000538 A1 1/2003

OTHER PUBLICATIONS https://www.water-technology.net/wp-content/uploads/sites/28/2019/04/28tracstar_hero-e1550574316475.jpg, Oct. 11, 2019.
(Continued)

*Primary Examiner* — Santosh R Poudel
(74) *Attorney, Agent, or Firm* — Conrad J. Hsu

(57) ABSTRACT

Techniques for implementing and/or operating a deployment system that includes a vehicle frame of a deployment vehicle, a drive sub-system, which includes wheels secured to the vehicle frame, a swage machine, and a fluid power sub-system. The swage machine includes a grab plate, which interlocks with a grab notch on a pipe fitting to be secured to a pipe segment, which includes tubing that defines a pipe bore and a fluid conduit implemented in an annulus of the tubing, a die plate including a die, and a fluid actuator that actuates the grab plate toward the die plate to facilitate conformally deforming a fitting jacket of the pipe fitting around the tubing of the pipe segment. The fluid power sub-system selectively powers the drive sub-system or the swage machine based on a target operation to be performed by the deployment vehicle.

14 Claims, 14 Drawing Sheets

(51) Int. Cl.
  *B62D 59/02* (2006.01)
  *B21D 39/03* (2006.01)
  *B60D 1/48* (2006.01)
  *B60K 17/04* (2006.01)
  *B60K 8/00* (2006.01)
  *B62D 55/06* (2006.01)

(52) U.S. Cl.
  CPC .............. *B60K 8/00* (2013.01); *B60K 17/04* (2013.01); *B62D 59/02* (2013.01); *G05B 19/404* (2013.01); *B62D 55/06* (2013.01); *G05B 2219/45152* (2013.01)

(58) Field of Classification Search
  CPC .......... B62D 55/06; B60K 17/04; B60K 8/00; B60D 1/48
  See application file for complete search history.

(56) References Cited

U.S. PATENT DOCUMENTS

| | | | |
|---|---|---|---|
| 10,723,254 B2 | 7/2020 | Barnett et al. | |
| 10,953,960 B1* | 3/2021 | Sharp | B01D 53/00 |
| 2005/0137753 A1 | 6/2005 | Basson et al. | |
| 2006/0192378 A1 | 8/2006 | Bormioli | |
| 2008/0066671 A1* | 3/2008 | Donahue | B60J 7/1265 |
| | | | 114/361 |
| 2012/0034056 A1* | 2/2012 | Schmidgall | B60P 7/12 |
| | | | 414/502 |
| 2013/0030661 A1 | 1/2013 | Opperman | |
| 2015/0361968 A1 | 12/2015 | Schroeder et al. | |
| 2016/0025113 A1* | 1/2016 | Hiraku | E02F 9/2292 |
| | | | 60/428 |
| 2017/0016208 A1* | 1/2017 | Saitoh | E02F 9/2239 |
| 2019/0039426 A1* | 2/2019 | Nuhn | B60F 3/0007 |
| 2019/0194904 A1* | 6/2019 | Karasawa | E02F 9/2025 |
| 2019/0256097 A1 | 8/2019 | Watt et al. | |
| 2019/0257445 A1 | 8/2019 | Case et al. | |
| 2020/0094990 A1 | 3/2020 | Chan et al. | |
| 2020/0208737 A1 | 7/2020 | McGuire et al. | |

OTHER PUBLICATIONS https://www.controleng.com/wp-content/uploads/sites/2/2016/03/OGE1604_WEB_IMG_Oceaneering_Cover_Story_2Slider.jpg, Oct. 11, 2019.
https://www.mcelroy.com/fusion-static/images/2000talon_hero.jpg, Oct. 11, 2019.
https://www.acu-tech.com.au/wp-content/uploads/2018/07/Acu-Tech-Pipe-Welder-Copy-e1531126650218.jpg, Oct. 11, 2019.
https://isco-pipe.com/wp-content/uploads/2019/07/T630-C54671-2.jpg, Oct. 11, 2019.
https://www.daygroup.ca/uploads/1/2/2/1/122125383/pa050021_orig.jpg, Oct. 11, 2019.
The International Search Report and the Written Opinion of the International Searching Authority for Application No. PCT/US2021/035030, dated Jun. 30, 2021.

* cited by examiner

REMOTELY OPERATED PIPE FITTING SWAGING SYSTEMS AND METHODS

CROSS-REFERENCE

The present disclosure is a continuation of U.S. patent application Ser. No. 16/886,496, filed May 28, 2020 and entitled "REMOTELY OPERATED PIPE FITTING SWAGING SYSTEMS AND METHODS," which is incorporated herein by reference in its entirety for all purposes.

BACKGROUND

The present disclosure generally relates to pipeline systems and, more particularly, to a deployment system that may be implemented and/or operated to facilitate securing a pipe fitting (e.g., connector) to a pipe segment in a pipeline system using swaging techniques.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to pipe fittings (e.g., connectors), such as a midline pipe fitting and/or a pipe end fitting. Generally, a pipe segment may include tubing, which defines (e.g., encloses) a bore that provides a primary fluid conveyance (e.g., flow) path through the pipe segment. Additionally, one or more pipe fittings may generally be secured to a pipe segment to facilitate fluidly coupling the pipe segment to another pipe segment, a fluid source, and/or a fluid destination. In particular, in some instances, a pipe fitting may be secured to a pipe segment via swaging techniques that conformally deform at least a portion of the pipe fitting around the tubing of the pipe segment.

To facilitate securing a pipe fitting to a pipe segment using swaging techniques, a deployment system may include a swage machine having one or more dies and one or more fluid (e.g., hydraulic and/or pneumatic) actuators. Additionally, the deployment system may include a fluid (e.g., hydraulic and/or pneumatic) power sub-system, which is implemented and/or operated to selectively supply actuation fluid to and/or extract actuation fluid from the one or more fluid actuators of the swage machine, and a control sub-system, which is implemented and/or operated to generally control operation of the deployment system. However, at least in some instances, implementing a deployment system with multiple discrete components may limit operational efficiency of the deployment system, for example, due at least in part to the swage machine of the deployment system, a fluid power sub-system of the deployment, and a control sub-system of the deployment system being moved separately from one another.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a deployment system includes a vehicle frame of a deployment vehicle, a drive sub-system, which includes one or more wheels secured to the vehicle frame of the deployment vehicle, a swage machine, and a fluid power sub-system. The swage machine includes a grab plate, which interlocks with a grab notch implemented on a pipe fitting to be secured to a pipe segment that includes tubing that defines a pipe bore and a fluid conduit implemented in an annulus of the tubing, a die plate including a die, and a fluid actuator that actuates the grab plate toward the die plate to facilitate conformally deforming a fitting jacket of the pipe fitting around the tubing of the pipe segment. Additionally, the fluid power sub-system selectively powers the drive sub-system or the swage machine based at least in part on a target operation to be performed by the deployment vehicle.

In another embodiment, a method of operating a deployment system integrated on a deployment vehicle includes determining, using a control sub-system of the deployment system, a target operation to be performed by the deployment vehicle, in which a fluid power sub-system, a swage machine, and a drive sub-system of the deployment system are disposed on a vehicle frame of the deployment vehicle, determining, using the control sub-system, whether the target operation to be performed by the deployment vehicle is a vehicle drive operation, instructing, using the control sub-system, the deployment vehicle to power operation of the drive sub-system using the fluid power sub-system disposed on the vehicle frame to facilitate moving the deployment vehicle in response to determining that the target operation to be performed by the deployment vehicle is the vehicle drive operation, determining, using the control sub-system, whether the target operation to be performed by the deployment vehicle is a fitting swage operation, and instructing, using the control sub-system, the deployment vehicle to power operation of the swage machine using the fluid power sub-system disposed on the vehicle frame to facilitate securing a pipe fitting to pipe segment tubing in response to determining that the target operation to be performed by the deployment vehicle is the fitting swage operation.

In another embodiment, a deployment vehicle includes a vehicle frame, a drive sub-system, which includes one or more wheels secured to the vehicle frame, a swage machine secured to the vehicle frame, a fluid power sub-system secured to a housing of the swage machine, and a vehicle control sub-system secured to the housing of the swage machine. The swage machine includes a die, a fluid actuator that causes the die and a pipe fitting secured to the swage machine to move in an axial direction relative to one another to facilitate swaging the pipe fitting to a pipe segment, and the housing, which is disposed around the fluid actuator. Additionally, the fluid power sub-system includes an actuation fluid reservoir, a fluid pump fluidly coupled to the actuation fluid reservoir, and a motor comprising a motor shaft. Furthermore, the vehicle control sub-system instructs the deployment vehicle to power operation of the drive sub-system using the fluid power sub-system of the deployment vehicle when a target operation to be performed by the deployment vehicle is a vehicle drive operation and instructs the deployment vehicle to power operation of the swage machine using the fluid power sub-system of the deployment vehicle when the target operation to be performed by the deployment vehicle is a fitting swage operation.

DETAILED DESCRIPTION

Figure 1:
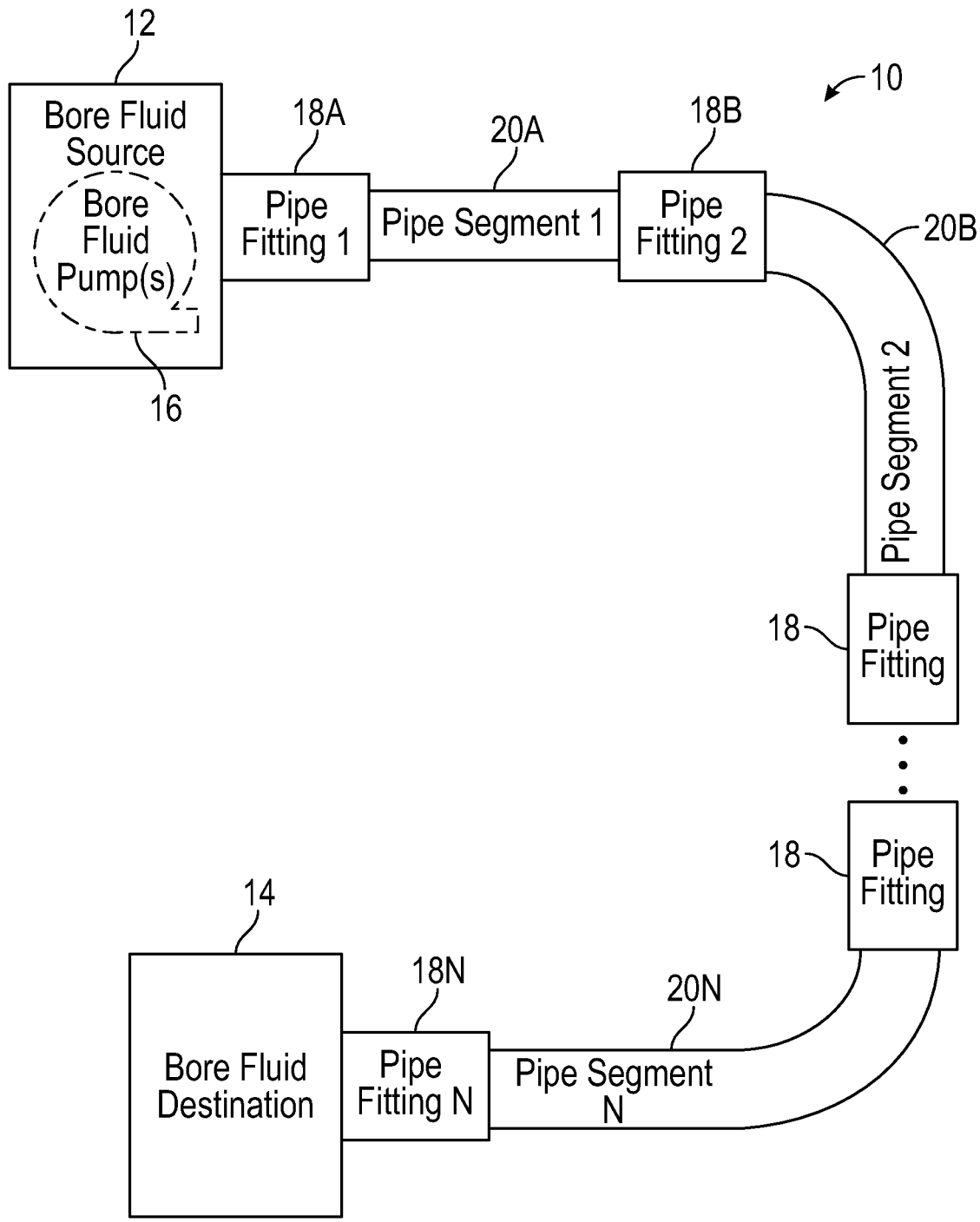
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

Additionally, in some instances, a deployment system may be implemented and/or operated to facilitate securing a pipe fitting to a pipe segment. In particular, in some such instances, the deployment system may secure the pipe fitting to the pipe segment using swaging techniques, which conformally deform a fitting jacket of the pipe fitting around the portion of the pipe segment tubing that is inserted into a tubing cavity defined (e.g., enclosed) between the fitting jacket and a fitting tube of the pipe fitting. To facilitate securing a pipe fitting to a pipe segment using swaging techniques, the deployment system may include a swage machine, which has one or more dies and one or more fluid (e.g., hydraulic and/or pneumatic) actuators. Additionally, the deployment system may include a fluid (e.g., hydraulic and/or pneumatic) power sub-system, which is implemented and/or operated to selectively supply and/or extract actuation fluid (e.g., liquid and/or gas), and a control sub-system, which is implemented and/or operated to generally control operation of the deployment system. However, at least in some instances, implementing a deployment system with multiple discrete components may limit operational efficiency of the deployment system, for example, due at least in part to the swage machine of the deployment system, a fluid power sub-system of the deployment system, and a control sub-system of the deployment system being moved separately from one another.

Accordingly, to facilitate improving deployment system operational efficiency, the present disclosure provides techniques for implementing and/or operating a deployment system integrated on one or more (e.g., remotely operated) deployment vehicles. In particular, as will be described in more detail below, in some embodiments, a deployment system may be integrated on a deployment vehicle at least in part by disposing its swage machine, its fluid (e.g., hydraulic and/or pneumatic) power sub-system, and at least a portion its control sub-system on a vehicle frame of the deployment vehicle. For example, in some such embodiments, the swage machine may be secured directly to the vehicle frame, the fluid power sub-system may be secured to the housing of the swage machine, and the portion of the control sub-system may be secured to the housing of the swage machine. By integrating the deployment system on the deployment vehicle in this manner, the integrated deployment system may enable its swage machine, its fluid power sub-system, and the portion of its control sub-system to be moved together as a unit, which, at least in some instances, may facilitate improving operational efficiency of the integrated deployment system.

To facilitate moving an integrated deployment system as a unit, the integrated deployment system may additionally include a drive (e.g., wheel and/or track) sub-system secured to the vehicle frame of a deployment vehicle. Generally, the drive sub-system may include one or more wheels tied to a drive gear, for example, in addition to one or more tracks disposed around the one or more wheel. As such, actuating the drive gear may cause rotation of the one or more wheels and, thus, facilitate propelling (e.g., driving and/or moving) the deployment vehicle.

However, in other embodiments, a deployment system may be integrated on multiple deployment vehicles, such as a tow vehicle and a trailer vehicle, which is implemented to be towed by the tow vehicle. For example, in some such embodiments, a swage machine and a drive sub-system of the deployment system may be disposed on a vehicle frame of the tow vehicle while a fluid power sub-system of the deployment system is disposed on a vehicle frame of the trailer vehicle. In other such embodiments, a fluid power sub-system and a drive sub-system of the deployment system may be disposed on a vehicle frame of the tow vehicle while the swage machine is disposed on a vehicle frame of the trailer vehicle.

In any case, to facilitate actuating one or more of its wheels, in some embodiments, a drive sub-system may include one or more dedicated motors, such as an electric motor or an internal combustion engine, for example, which are implemented and/or operated to actuate a drive gear that is tied to the one or more wheels. However, to facilitate reducing its implementation associated cost, such as component count and/or physical footprint (e.g., size), in other embodiments, an integrated deployment system may be implemented to enable its fluid (e.g., hydraulic and/or pneumatic) power sub-system to be used to selectively power its drive sub-system or its swage machine. Generally, a fluid power sub-system may include an actuation fluid reservoir, one or more fluid pumps fluidly coupled to the actuation fluid reservoir, and one or more motors, such as an electric motor or an internal combustion engine. When a motor shaft of a motor is interlocked with a fluid gear that is tied to one or more fluid pumps in the fluid power sub-system, the motor may be operated to actuate the one or more fluid pumps such that the one or more fluid pumps expel and/or draw actuation fluid.

Thus, to facilitate powering a drive sub-system of an integrated deployment system using a corresponding fluid power sub-system, in some embodiments, a control sub-system may instruct integrated deployment system to disconnect a motor shaft of one or more motors in the fluid power sub-system from a pump gear, which is tied to one or more fluid pumps in the fluid power sub-system, and to reconnect the motor shaft to a drive gear, which is tied to one or more wheels in the drive sub-system. In other embodiments, to facilitate powering a drive sub-system of an integrated deployment system using a corresponding fluid power sub-system, a control sub-system may instruct the integrated deployment system to route an actuation fluid flow produced by one or more fluid pumps in the fluid power sub-system to a drive gear, which is tied to one or more wheels of the drive sub-system, instead of to one or more fluid actuators in a swage machine. In other words, at least in some instances, powering a drive sub-system of a deployment vehicle in an integrated deployment system using a corresponding fluid power sub-system may obviate implementation of one or more dedicated motors in the drive sub-system and, thus, facilitate reducing implementation associated cost, such as physical footprint (e.g., size) and/or component count, of the integrated deployment system.

To facilitate selectively powering a swage machine or a drive sub-system of an integrated deployment system using a corresponding fluid power sub-system, a switching device may be coupled between the fluid power sub-system, the swage machine, and the drive sub-system. In particular, in some embodiments, the switching device in an integrated deployment system may be a transmission (e.g., clutch and gear box) that is implemented and/or operated to selectively interlock a motor shaft of one or more motors in the fluid power sub-system with a drive gear, which is tied to one or more wheels in the drive sub-system, or a pump gear, which is tied to one or more fluid pumps in the fluid power sub-system. In other embodiments, the switching device in an integrated deployment system may be a directional control valve (DCV) that is implemented and/or operated to selectively provide a flow path for actuation fluid flow to a fluid actuator in the swage machine or to a drive gear that is tied to one or more wheels in the drive sub-system, for example, which is coupled in series with another directional control valve that is implemented and/or operated to control supply of actuation fluid to a cap side and/or a piston (e.g., rod) side of a fluid actuator in the swage machine.

To enable an integrated deployment system to control operation of a switching device deployed therein, a control sub-system of the integrated deployment system may be communicatively coupled to the switching device. In fact, to facilitate remotely controlling operation of a (e.g., remotely operated) deployment vehicle, in some embodiments, a control sub-system of an integrated deployment system may be split (e.g., divided) between a vehicle control sub-system, which is to be disposed at the deployment vehicle, and a remote (e.g., handheld and/or belly pack) control sub-system, which can be moved away from the deployment vehicle. In particular, in such embodiments, the vehicle control sub-system and the remote control sub-system may be communicatively coupled, for example, via a wireless connection and/or a wired connection. In other words, in such embodiments, the remote control sub-system may be implemented to enable a user (e.g., operator), such as a service technician, to monitor and/or control operation of the deployment vehicle in the integrated deployment system while being located remotely relative to the deployment vehicle.

Since a user (e.g., operator) may be located remotely, to facilitate properly operating a (e.g., remotely operated) deployment vehicle, in some embodiments, an integrated deployment system may include one or more sensors implemented at the deployment vehicle. For example, a vehicle location sensor, which is determines sensor data indicative of location of the deployment vehicle, may be deployed at the deployment vehicle. Thus, in such embodiments, operation of a drive sub-system of the integrated deployment system may be controlled based at least in part on the sensor data received from the vehicle location sensor, for example, at least in part by comparing a current location of the remotely operated vehicle indicated by the sensor data against a target location at which a pipe fitting to be swaged using the deployment vehicle is deployed in a pipeline system.

Additionally or alternatively, in some embodiments, a die position sensor, which determines sensor data indicative of the position of a die in a swage machine on a deployment vehicle of an integrated deployment system relative to a pipe fitting secured to the swage machine, may be deployed at the deployment vehicle. By monitoring the sensor data received from the die position sensor over time, in such embodiments, the control sub-system of the integrated deployment system may determine the length of a pipe fitting that has already been swaged by the swage machine. Thus, in such embodiments, operation of the swage machine integrated on the deployment vehicle may be controlled based at least in part on the sensor data received from the die position sensor, for example, at least in part by comparing a currently swaged distance on the pipe fitting that is indicated by the sensor data against a target swage distance determined based at least in part on the length of a fitting jacket of the pipe fitting that is being swaged or is to be swaged using the swage machine. In this manner, as will be described in more detail below, the techniques described in the present disclosure may facilitate implementing and/or operating a deployment system that is integrated on one or more deployment vehicles, which, at least in some instances, may facilitate improving operational efficiency of the deployment system and, thus, the efficiency with which a pipeline system may be deployed using the deployment system, for example, at least in part by enabling the integrated deployment system to be moved as a unit.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
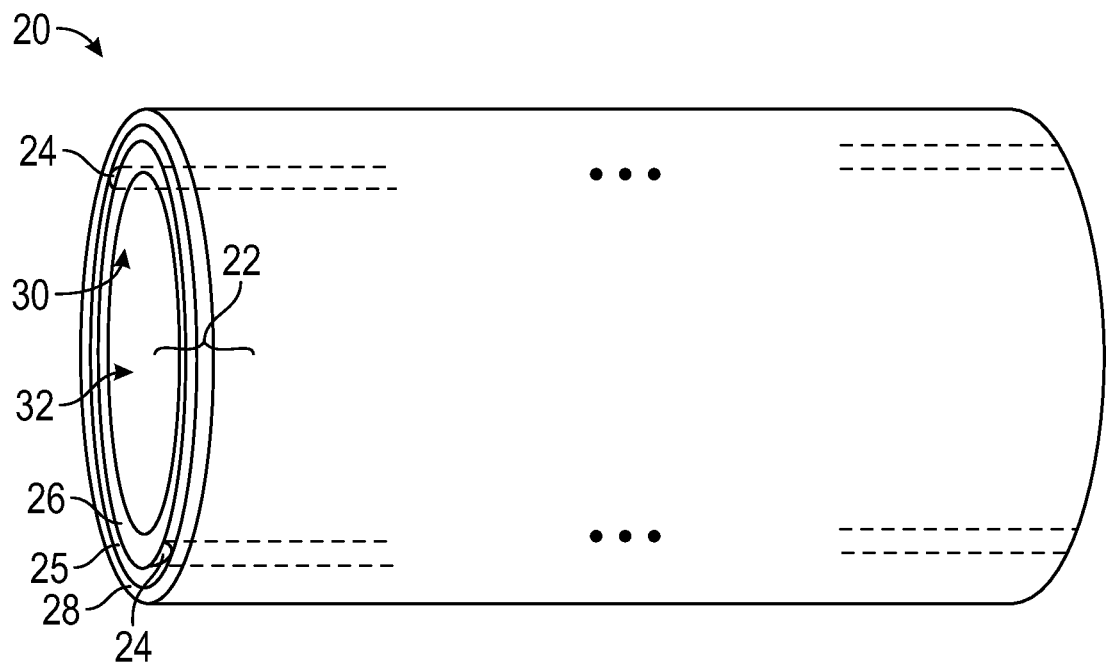
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
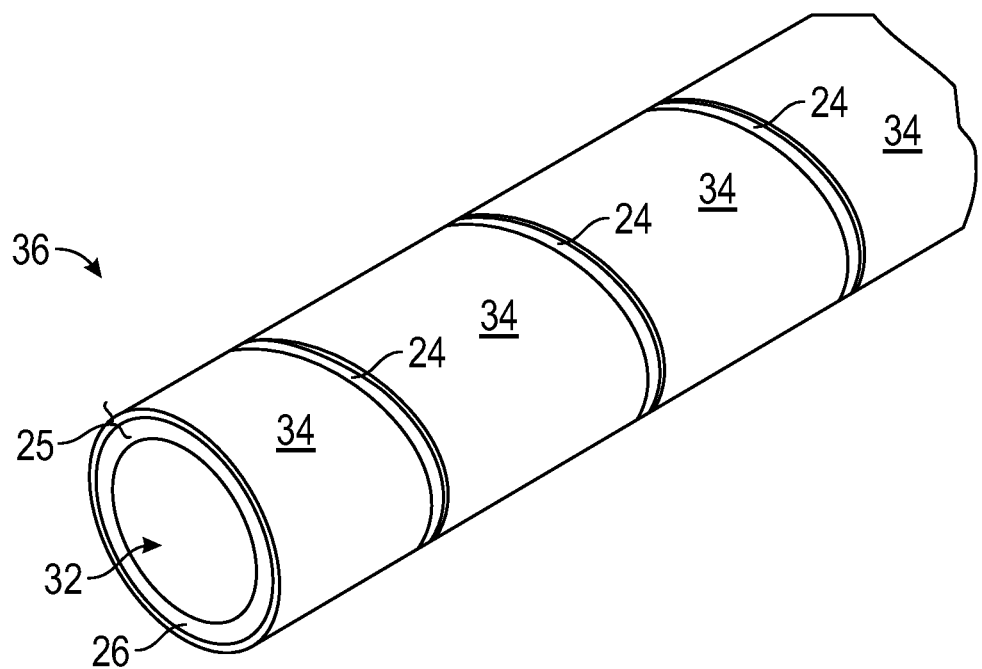
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, as described above, in some instances, a deployment system may be implemented and/or operated to facilitate securing a pipe fitting 18 to a pipe segment 20. In particular, in some such instances, the deployment system may be implemented and/or operated to secure a pipe fitting 18 to a pipe segment 20 using swaging techniques. To secure a pipe fitting 18 to a pipe segment 20 using swaging techniques, the tubing 22 of the pipe segment 20 may be inserted into a tubing cavity, which is defined (e.g., enclosed) between a fitting jacket and a fitting tube of the pipe fitting 18, and the deployment system may conformally deform the fitting jacket around the tubing 22 of the pipe segment 20.

Figure 4:
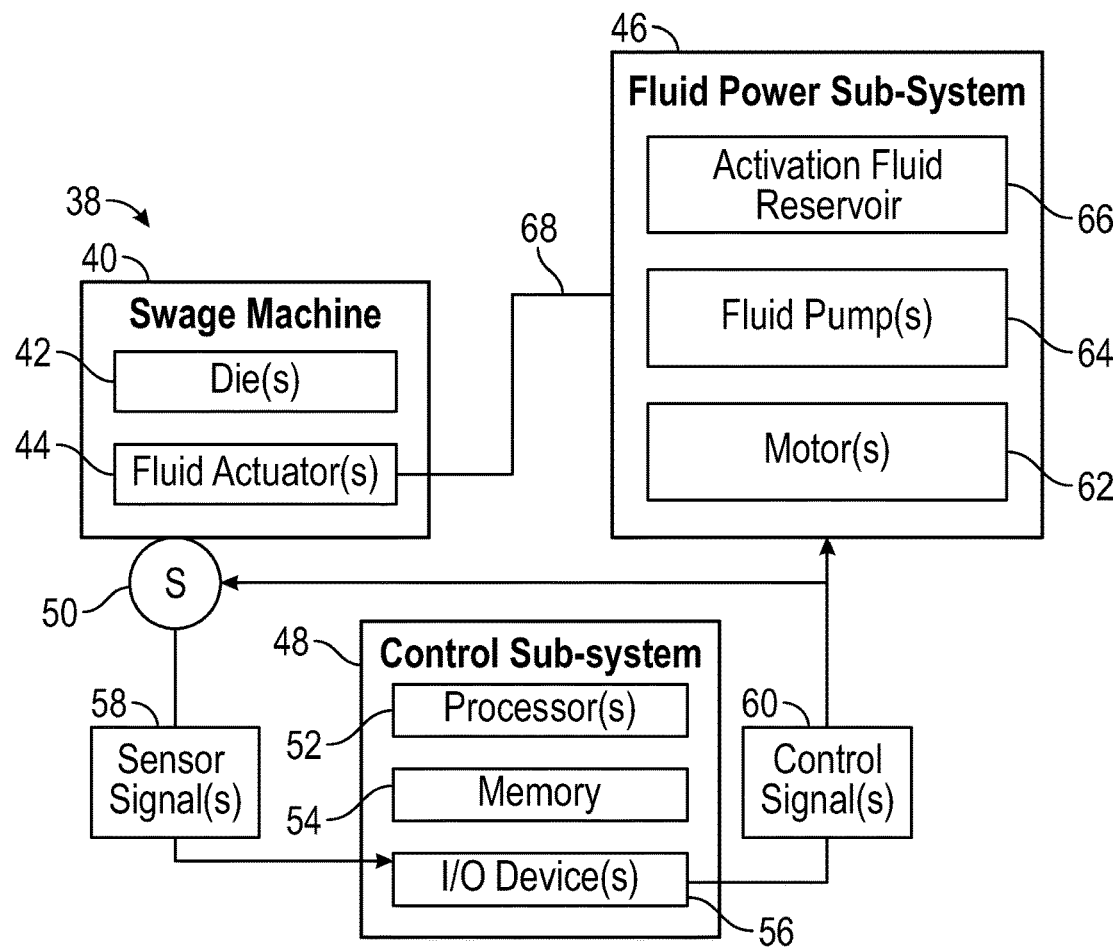
FIG. 4 is block diagram of an example of a deployment system, which includes a swage machine, a fluid (e.g., hydraulic and/or pneumatic) power sub-system, and a control sub-system, in accordance with an embodiment of the present disclosure.

To help illustrate, an example of a deployment system 38 is shown in FIG. 4. As depicted, to facilitate securing a pipe fitting 18 to a pipe segment 20 using swaging techniques, the deployment system 38 includes a swage machine 40, which includes one or more dies 42 and one or more fluid (e.g., hydraulic and/or pneumatic) actuators 44. Additionally, as depicted, the deployment system 38 includes a fluid (e.g., hydraulic and/or pneumatic) power sub-system 46, a control sub-system 48, and one or more sensors 50.

However, it should be appreciated that the depicted example is merely intended to be illustrative and not limiting. In particular, as will be described in more detail below, a deployment system 38 may include one or more additional sub-systems, such as a drive (e.g., track and/or wheel) sub-system. Moreover, one or more sensors 50 may additionally or alternatively be implemented at the fluid power sub-system 46 of a deployment system 38.

In any case, a sensor 50 in a deployment system 38 may generally be implemented and/or operated to determine (e.g., sense and/or measure) sensor data indicative of one or more operational parameters of the deployment system 38. For example, a location sensor 50 may be determine sensor data indicative of the location of the swage machine 40. Additionally or alternatively, a die position sensor 50 may determine sensor data indicative of the position of a die 42 in the swage machine 40 relative to a pipe fitting 18 secured to the swage machine 40. Moreover, in some embodiments, the sensors 50 of a deployment system 38 may include one or more image sensors (e.g., cameras) 50, for example, to enable a user (e.g., operator), such as a service technician, to remotely monitor and/or control operation of the deployment system 38.

Furthermore, a control sub-system 48 in a deployment system 38 may be implemented and/or operated to generally control operation of the deployment system 38, for example, based at least in part on sensor data received from one or more sensors 50. To facilitate controlling operation, as in the depicted example, the control sub-system 48 may include one or more processors 52, memory 54, and one or more input/output (I/O) devices 56. In some embodiments, the memory 54 in the control sub-system 48 may include a tangible, non-transitory, computer-readable medium that is implemented and/or operated to store data and/or executable instructions. For example, the memory 54 may store sensor data based at least in part on one or more sensor signals 58 received from a sensor 50. As such, in some embodiments, the memory 54 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 52 in a control sub-system 48 may include processing circuitry that is implemented and/or operated to process data and/or execute instructions stored in memory 54. In other words, in some such embodiments, a processor 52 in the control sub-system 48 may include one or more general purpose microprocessors, one or more application specific integrated circuits (ASICs), one or more field programmable gate arrays (FPGAs), or any combination thereof. For example, the processor 52 may execute instructions stored in memory 54 to determine a control signal 60 that instructs a sensor 50 to return a sensor signal 58 indicative of sensor data determined (e.g., sensed and/or measured) by the sensor 50. Additionally or alternatively, the processor 52 may process sensor data stored in memory 54 to determine a control signal 60 that instructs one or more motors 62, such as an electric motor or an internal combustion engine, to actuate one or more fluid pumps 64 in the fluid power sub-system 46 such that actuation fluid (e.g., liquid and/or gas) is supplied from an activation fluid reservoir 66 in the fluid power sub-system 46 to one or more fluid actuators 44 in the swage machine 40 via one or more actuation fluid conduits 68 and/or extracted from the one or more fluid actuators 44 in the swage machine 40 to the actuation fluid reservoir 66 in the fluid power sub-system 46 via the one or more actuation fluid conduits 68.

To enable communication outside of the control sub-system 48, in some embodiments, the one or more I/O devices 56 of the control sub-system 48 may include one or more input/output (I/O) ports. Additionally, to enable user interaction with the deployment system 38, in some embodiments, the I/O devices 56 in the control sub-system 48 may include one or more user input devices and/or one or more user output devices. For example, the one or more user input devices in the control sub-system 48 may include a hard button, a soft button, a keyboard, a mouse, and/or the like. Additionally or alternatively, the one or more user output device in the control sub-system 48 may include an electronic display, for example, which is implemented and/or operated to display a graphical user interface (GUI) that provides a visual representation of the status of an operation, such as a fitting swage operation, to a user (e.g., operator), such as a service technician. In any case, as mentioned above, during a fitting swage operation, the swage machine 40 may cause its one or more dies 42 and a pipe fitting 18 secured thereto to move in an axial direction relative to one another using its one or more fluid actuators 44 to facilitate conformally deforming the pipe fitting 18 around the tubing 22 of a pipe segment 20 inserted therein.

To help further illustrate, an example cross-section of a swage machine 40A and a portion 68 of a pipeline system 10 is shown in FIG. 4. As depicted, the portion 68 of the pipeline system 10 includes a first pipe segment 20A, a second pipe segment 20B, and a pipe fitting 18, which is coupled between the first pipe segment 20A and the second pipe segment 20B. Additionally, as depicted, the pipe fitting 18 includes a fitting tube 70 and a grab ring 72, which is implemented around the fitting tube 70. In particular, as depicted, the fitting tube 70 defines (e.g., encloses) a fitting bore 74, which is fluidly coupled to a first pipe bore 32A of the first pipe segment 20A and a second pipe bore 32B of the second pipe segment 20B.

Figure 5:
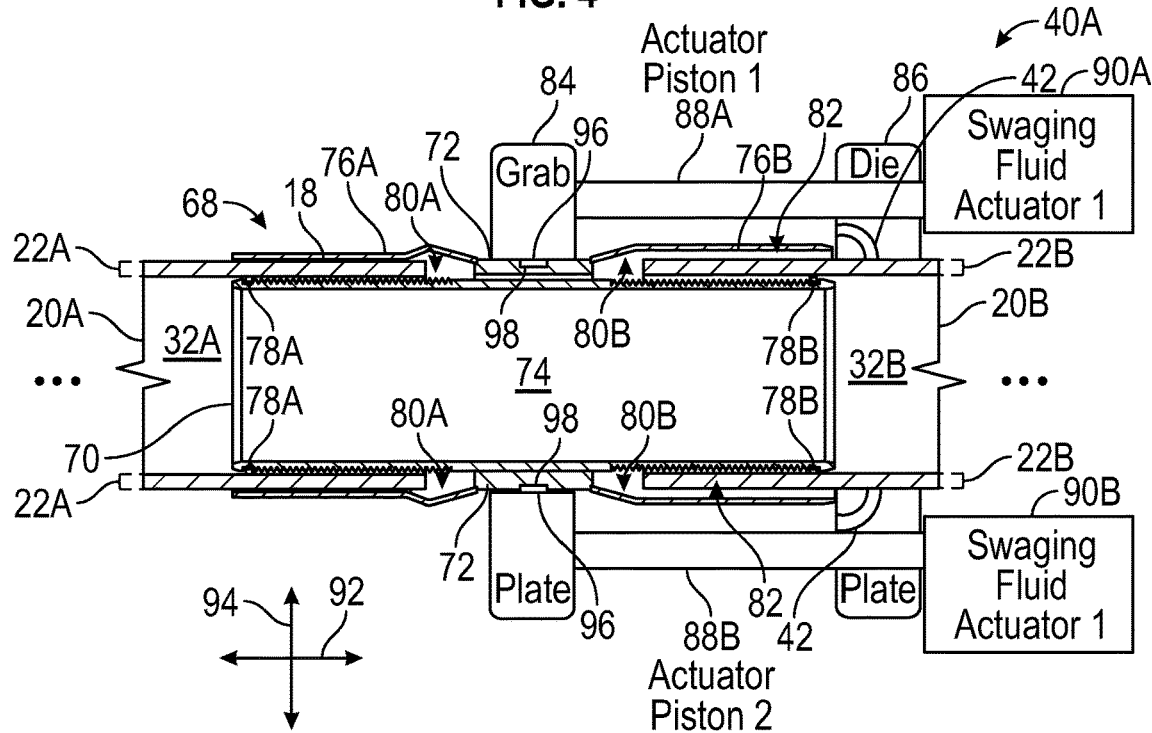
FIG. 5 is an axial cross-section profile of an example of the swage machine of FIG. 4 secured to a portion of the pipeline system of FIG. 1, in accordance with an embodiment of the present disclosure.

In other words, the pipe fitting 18 in FIG. 5 may be a midline pipe fitting 18. However, it should be appreciated that the depicted example is merely intended to be illustrative and not limiting. In particular, in other embodiments, the techniques described in the present disclosure may additionally or alternatively be used with other types of pipe fittings 18, such as a pipe end fitting 18.

In any case, as depicted, the pipe fitting 18 includes fitting jackets 76—namely a first fitting jacket 76A and a second fitting jacket 76B—and fitting seals 78—namely a first fitting seal 78A and a second fitting seal 78B—implemented circumferentially around the fitting tube 70. In particular, as depicted, first tubing 22A of the first pipe segment 20A is disposed in a first tubing cavity 80A of the pipe fitting 18, which is defined between the first fitting jacket 76A and the fitting tube 70. Similarly, second tubing 22B of the second pipe segment 20B is disposed in a second tubing cavity 80B of the pipe fitting 18, which is defined between the second fitting jacket 76B and the fitting tube 70.

However, as depicted, open space 82 is present between the second tubing 22B of the second pipe segment 20B and the pipe fitting 18 whereas minimal open space is present between the first tubing 22A of the first pipe segment 20A and the pipe fitting 18. In other words, the pipe fitting 18 may exert more resistance to tubing movement in the first tubing cavity 80A and, thus, facilitate securing the pipe fitting 18 to the first pipe segment 20A, for example, in addition to sealing the first tubing 22A in the first tubing cavity 80A via the first fitting seal 78A. On the other hand, the pipe fitting 18 may exert less resistance to tubing movement in the second tubing cavity 80B, which, at least in some instances, may enable the second tubing 22B of the second pipe segment 20B to move relatively freely into and/or out from the second tubing cavity 80B of the pipe fitting 18. As such, to facilitate securing and sealing the second pipe segment 20B in the pipe fitting 18, the deployment equipment 38 may be operated to conformally deform (e.g., swage) the second fitting jacket 76B around the second tubing 22B of the second pipe segment 20B, thereby consuming at least a portion (e.g., majority) of the open space 82.

To facilitate conformally deforming a fitting jacket 76 around pipe segment tubing 22, as in the depicted example, the deployment equipment 38 may include a grab plate 84, a die plate 86, and one or more fluid (e.g., hydraulic and/or pneumatic) actuators 44—namely one or more swaging fluid actuators 90. More specifically, in the depicted example, the swage machine 40A includes a first swaging fluid actuator 90A, which includes a first swaging actuator cylinder 87A that is secured to the die plate 86 and a first swaging actuator piston (e.g., rod) 88A that extends through the die plate 86 and is secured to the grab plate 84. Additionally, in the depicted example, the swage machine 40A includes a second swaging fluid actuator 90B, which includes a second swaging actuator cylinder 87B that is secured to the die plate 86 and a second swaging actuator piston 88B that extends through the die plate 86 and is secured to the grab plate 84. As such, in some embodiments, the first swaging fluid actuator 90A and/or the second swaging fluid actuator 90B may be operated (e.g., controlled) to selectively pull the grab plate 84 toward the die plate 86 and/or to selective push the grab plate 84 away from the die plate 86.

Furthermore, as depicted, a die (e.g., one or more die segments or die halves) 42 is disposed in the die plate 86. When a fitting jacket 76 and the die 42 are compressed against one another in an axial direction 92, the shape of the die 42 may compress the fitting jacket 76 inwardly in a radial direction 94, for example, such that the fitting jacket 76 and pipe segment tubing 22 disposed in a corresponding tubing cavity 80 are conformally deformed and/or such that the pipe segment tubing 22 and a fitting seal 78 in the tubing cavity 80 are compressed against each other. In fact, in some embodiments, different dies 42 may be selectively used in the die plate 86, for example, during successive compression cycles and/or depending on characteristics, such as diameter and/or material thickness, of the fitting jacket 76.

To facilitate compressing a die 42 loaded in the die plate 86 and a fitting jacket 76 against one another, as in the depicted example, the grab plate 84 of the swage machine 40A may be secured to the pipe fitting 18 via one or more grab tabs 96. In particular, as in the depicted example, a grab tab 96 on the swage machine 40A may be implemented (e.g., sized and/or shaped) to matingly interlock (e.g., interface and/or engage) with a corresponding grab notch 98 on the grab ring 72 of the pipe fitting 18 and, thus, facilitate securing the swage machine 40A to the pipe fitting 18. As described above, the swage machine 40A may then force (e.g., pull) its grab plate 84 toward its die plate 86 and, thus, the pipe fitting 18 secured to the grab plate 84 through the die 42 loaded in the die plate 86, which, at least in some instances, may conformally deform the second fitting jacket 76B of the pipe fitting 18 and the second tubing 22B of the second pipe segment 20B and, thus, facilitate securing the pipe fitting 18 to the second pipe segment 20B, for example, in addition to sealing the second tubing 22B in the second tubing cavity 80B via the second fitting seal 78B. In this manner, a swage machine 40 may be implemented and/or operated to facilitate securing a pipe fitting 18 to a pipe segment 20.

However, it should be appreciated that the depicted example is merely intended to be illustrative and not limiting. In particular, in other embodiments, a swage machine 40 may be implemented with a different configuration, for example, to enable to the swage machine 40 to swage a pipe fitting 18 secured to its grab plate 84 at least in part by forcing (e.g., pushing and/or pulling) its die plate 86 and, thus, a die 42 loaded therein over the pipe fitting 18. Additionally or alternatively, in other embodiments, a swage machine 40 may include a single swaging fluid actuator 90 or more than two swaging fluid actuators 90. Furthermore, in some embodiments, a swage machine 40 may include one or more other types of fluid (e.g., hydraulic and/or pneumatic) actuators 44, such as a clamping fluid actuator and/or a pinning fluid actuator. Moreover, in some embodiments, a swage machine 40 may additionally include a housing.

Figure 6:
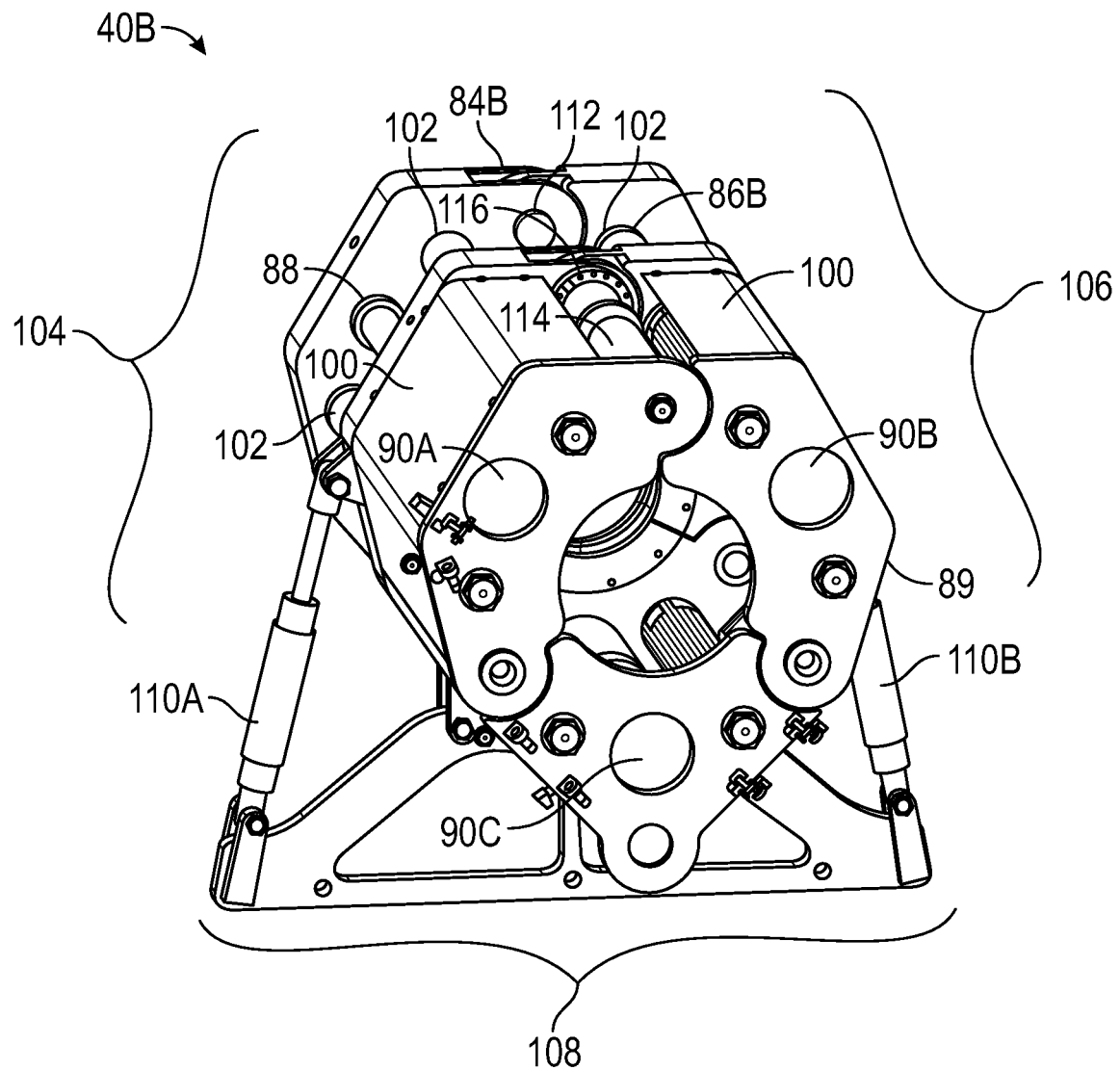
FIG. 6 is a perspective view of an example of the swage machine of FIG. 4, in accordance with an embodiment of the present disclosure.

To help illustrate, a more detailed example of a swage machine 40B, which includes a housing 100, is shown in FIG. 6. As depicted, the swage machine 40B includes multiple swaging fluid actuators 90—namely a first swaging fluid actuator 90A, a second swaging fluid actuator 90B, and a third swaging fluid actuator 90C, which are each disposed within the housing 100 of the swage machine 40B. In particular, as depicted, each swaging fluid actuator 90 is secured to a grab plate 84B of the swage machine 40B via a corresponding swaging actuator piston (e.g., rod) 88 that extends through a die plate 86B of the swage machine 40B. Additionally, as depicted, the swage machine 40B includes support rods 102 that extend between the die plate 86B and the grab plate 84B, for example, such that the support rods 102 extend through the die plate 86B and are secured to a support plate 89.

As described above, to facilitate performing a fitting swage operation on a pipe fitting 18, a swage machine 40 may be secured to the pipe fitting 18 at least in part by interlocking (e.g., engaging and/or interfacing) a grab tab 96 implemented on its grab plate 84 with a grab notch 98 implemented on a grab ring 72 of the pipe fitting 18. To facilitate interlocking a grab tab 96 on the swage machine 40 with a grab notch 98 on the pipe fitting 18, in some embodiments, the swage machine 40 may be in an opened state to enable the pipe fitting 18 to be laid therein. Once the grab tab 96 on the swage machine 40 is aligned with the grab notch 98 on the pipe fitting 18, the swage machine 40 may be transitioned from its opened state to its closed state such that the grab tab 96 interlocks with the grab notch 98 and, thus, facilitates securing the swage machine 40 to the pipe fitting 18.

To enable switching between its opened state and its closed state, as in the depicted example, a swage machine 40 may include a first side portion 104 and a second side portion 106, which are each rotatably coupled to a base portion 108 of the swage machine 40. In particular, in the depicted example, the first side portion 104 of the swage machine 40B includes the first swaging fluid actuator 90A, a first portion of the housing 100 that is implemented around the first swaging fluid actuator 90A, a first portion of the die plate 86B, a first portion of the grab plate 84B, a first portion of the support plate 89, and one or more support rods 102 that extend between the first portion of the die plate 86B and the first portion of the grab plate 84B. Additionally, in the depicted example, the second side portion 106 of the swage machine 40B includes the second swaging fluid actuator 90B, a second portion of the housing 100 that is implemented around the second swaging fluid actuator 90B, a second portion of the die plate 86B, a second portion of the grab plate 84B, a second portion of the support plate 89, and one or more support rods 102 that extend between the second portion of the die plate 86B and the second portion of the grab plate 84B.

Moreover, to enable transitioning a swage machine 40 between its opened state and its closed state, as in the depicted example, the fluid actuators 44 implemented in the swage machine 40 may additionally include one or more clamping fluid (e.g., hydraulic and/or pneumatic) actuators 110. In particular, in the depicted example, the swage machine 40B includes a first clamping fluid actuator 110A, which is coupled between the first side portion 104 of the swage machine 40B and the base portion 108 of the swage machine 40B and, thus, may be operated to facilitate transitioning the first side portion 104 of the swage machine 40B between a first opened position corresponding with the opened state of the swage machine 40B and a first closed position corresponding with the closed state of the swage machine 40B. For example, extending the first clamping fluid actuator 110A may facilitate transitioning the first side portion 104 of the swage machine 40B toward the first closed position that corresponds with the closed state of the swage machine 40B. On the other hand, contracting the first clamping fluid actuator 110A may facilitate transitioning the first side portion 104 of the swage machine 40B toward the first opened position that corresponds with the opened state of the swage machine 40B.

Additionally, in the depicted example, the swage machine 40B includes a second clamping fluid actuator 110B, which is coupled between the second side portion 106 of the swage machine 40B and the base portion 108 of the swage machine 40B and, thus, may be operated to facilitate transitioning the second side portion 106 of the swage machine 40B between a second opened position corresponding with the opened state of the swage machine 40B and a second closed position corresponding with the closed state of the sage machine 40B. For example, contracting the second clamping fluid actuator 110B may facilitate transitioning the second side portion 106 of the swage machine 40B toward the second opened position that corresponds with the opened position of the swage machine 40B. On the other hand, extending the second clamping fluid actuator 110B may facilitate transitioning the second side portion 106 of the swage machine 40B toward the second closed position that corresponds with the closed position of the swage machine 40B.

To facilitate maintaining a swage machine 40 in its closed state, as in the depicted example, a swage machine 40 may include a manual pin 112, which is implemented to be selectively inserted in a manual pin opening in a first side portion 104 of the swage machine 40 as well as a corresponding manual pin opening implemented in a second side portion 106 of the swage machine 40. In particular, in the depicted example, a first manual pin opening is implemented in the first portion of the grab plate 84B that is included in the first portion 104 of the swage machine 40B and a second manual pin opening is implemented in the second portion of the grab plate 84B that is included in the second portion 106 of the swage machine 40B. As such, aligning the first manual pin opening in the first portion of the grab plate 84B with the second manual pin opening in the second portion of the grab plate 84B and securing a manual pin 112 therein may facilitate maintaining the first portion of the die plate 84B connected to the second portion of the die plate 84B and, thus, maintaining the swage machine 40B in its closed state.

Additionally or alternatively, to facilitate maintaining a swage machine 40 in its closed state, as in the depicted example, the swage machine 40 may include a fluid actuator 44—namely a pinning fluid (e.g., hydraulic and/or pneumatic) actuator 114—that includes a pinning actuator cylinder 115 and a pinning actuator piston (e.g., pin and/or rod) 116, which is implemented to be selectively inserted in a fluidly actuated pin opening in a first side portion 104 of the swage machine 40 as well as a corresponding fluidly actuated pin opening in a second side portion 106 of the swage machine 40. In particular, in the depicted example, a first fluidly actuated pin opening is implemented in the first portion of the die plate 86B that is included in the first portion 104 of the swage machine 40B and a second fluidly actuated pin opening is implemented in the second portion of the die plate 86B that is included in the second portion 106 of the swage machine 40B. As such, aligning the first fluidly actuated pin opening in the first portion of the die plate 86B with the second fluidly actuated pin opening in the second portion of the die plate 86B and operating the pinning fluid actuator 114 to insert its pinning actuator piston 116 therein may facilitate maintaining the first portion of the grab plate 86B connected to the second portion of the grab plate 86B and, thus, maintaining the swage machine 40B in its closed state.

However, it should be appreciated that the depicted example is merely intended to be illustrative and not limiting. In particular, in other embodiments, a swage machine 40 may not include a housing 100, a support rod 102, a support plate 89, or any combination thereof. Additionally or alternatively, a swage machine 40 may not include a manual pin 112 or corresponding manual pin openings, for example, when the swage machine 40 includes a pinning fluid actuator 114 and corresponding fluidly actuated pin openings. In other embodiments, a swage machine may not include a pinning fluid actuator 114 or corresponding fluidly actuated pin openings, for example, when the swage machine 40 includes a manual pin 112 and corresponding manual pin openings. Moreover, in some embodiments, a clamping fluid actuator 110 may not be implemented in a swage machine 40, for example, when the swage machine 40 is implemented to be manually transitioned between its opened state and its closed state.

In any case, as described above, a fluid actuator 44 in a swage machine 40 may actuate (e.g. move) based at least in part on the flow of actuation fluid between the fluid actuator 44 and one or more fluid pumps 64 in a fluid power sub-system 46, which are fluidly coupled to the fluid actuator 44 via one or more actuation fluid conduits 68. Moreover, to perform a fitting swage operation on a pipe fitting 18, as described above, the swage machine 40 may be moved to the location of the pipe fitting 18. Since coupled to the swage machine 40 via one or more actuation fluid conduits 68, the fluid power sub-system 46 may be moved along with the swage machine 40. However, at least in some instances, separately moving multiple discrete components in a deployment system 38 may limit operational efficiency of the deployment system 38 and, thus, deployment efficiency of a pipeline system 10 that is deployed using the deployment system 38.

As such, to facilitate improving deployment system operational efficiency, the present disclosure provides techniques for integrating multiple discrete components of a deployment system 38. In particular, as will be described in more detail below, the present disclosure provides techniques for integrating a fluid (e.g., hydraulic and/or pneumatic) power sub-system 46 and a control sub-system 48 of the deployment system 38 with a swage machine 40 of the deployment system 38 to enable the deployment system 38 to be moved as a unit, which, at least in some instances, may facilitate improving operational efficiency of the deployment system 38 and, thus, deployment efficiency of a pipeline system 10 that is deployed using the deployment system 38. For example, in some embodiments, a deployment system 38 may be integrated on a remotely operated vehicle (ROV).

Figure 7:
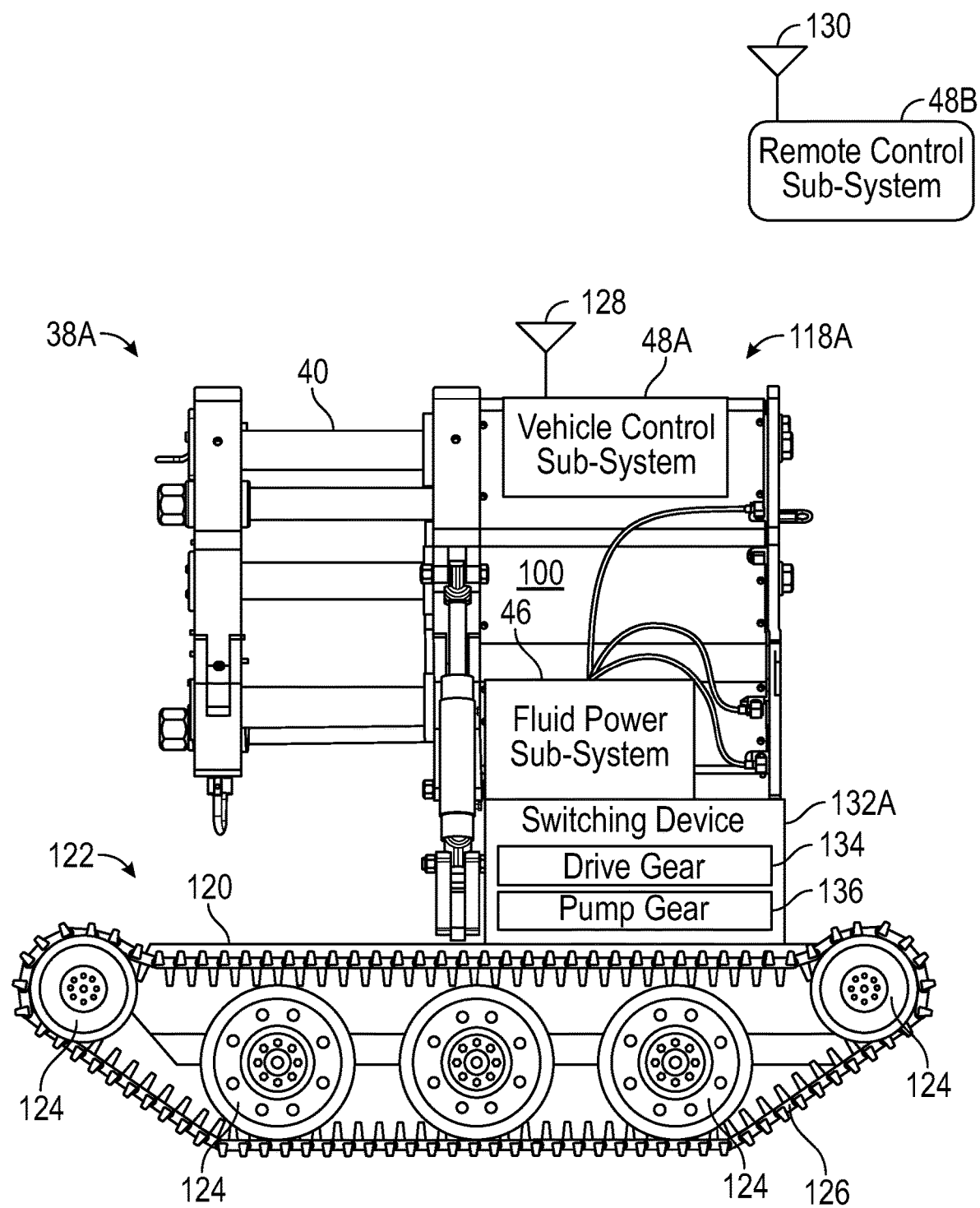
FIG. 7 is a side view of an example of the deployment system of FIG. 4 integrated on a (e.g., remotely operate) deployment vehicle, in accordance with an embodiment of the present disclosure.

To help illustrate, an example of a deployment system 38A, which is integrated on a (e.g., remotely operated) deployment vehicle 118A, is shown in FIG. 7. As depicted, the deployment vehicle 118A includes a vehicle frame 120. Additionally, as depicted, the integrated deployment system 38A includes a drive (e.g., track and/or wheel) sub-system 122, which includes multiple wheels 124 secured to the vehicle frame 120, for example, in addition to one or more tracks 126 disposed around the wheels 124. As such, rotating one or more of the wheels 124 may propel (e.g., drive and/or move) the deployment vehicle 118A and, thus, facilitate performing a vehicle drive operation.

Furthermore, as depicted, the integrated deployment system 38A includes a swage machine 40 and a fluid (e.g., hydraulic and/or pneumatic) power sub-system 46 implemented on the vehicle frame 120 of the deployment vehicle 118A. In particular, as in the depicted example, the swage machine 40 may be secured directly to the vehicle frame 120. Additionally, as in the depicted example, the fluid power sub-system 46 may be secured to the housing 100 of the swage machine 40.

To enable remotely controlling operation of the deployment vehicle 118A, as in the depicted example, a control sub-system 48 of the integrated deployment system 38A may be divided between a vehicle control sub-system 48A, which is implemented at the deployment vehicle 118A, and a remote (e.g., handheld and/or belly pack) control sub-system 48B, which can be moved away from the deployment vehicle 118A. For example, the vehicle control sub-system 48A may be secured to the housing 100 of the swage machine 40. To enable remotely controlling operation using the remote control sub-system 48B, the remote control sub-system 48B may be communicatively coupled to the vehicle control sub-system 48A. For example, as in the depicted example, the vehicle control sub-system 48A may include a vehicle antenna 128 and the remote control sub-system 48B may include a remote antenna 130, which are implemented and/or operated to enable the vehicle control sub-system 48A and the remote control sub-system 48B to communicate via a wireless connection.

However, it should be appreciated that the depicted example is merely intended to be illustrative and not limiting. In particular, in other embodiments, a vehicle control sub-system 48A and a remote control sub-system 48B may additionally or alternatively be implemented and/or operated to communicate via a wired connection. Furthermore, in other embodiments, a drive sub-system 122 of a deployment vehicle 118 may not include a track 126. Moreover, in other embodiments, a deployment vehicle 118 in an integrated deployment system 38 may be an underwater (e.g., submarine) deployment vehicle 118, for example, when used in offshore oil and gas applications.

In any case, as described above, in some embodiments, a fluid power sub-system 46 integrated on a deployment vehicle 118 of an integrated deployment system 38 may be used to selectively power a drive sub-system 122 integrated on the deployment vehicle 118 as well as selectively powering a swage machine 40 integrated on the deployment vehicle 118, for example, to facilitate obviating a separate motor in the deployment vehicle 118 and, thus, reducing implementation associated cost, such as component count and/or physical footprint (e.g., size), of the integrated deployment system 38. More specifically, as will be described in more detail below, the fluid power sub-system 46 may selectively power either the drive sub-system 122 or the swage machine 40 based at least in part on a target operation to be performed by the integrated deployment system 38. For example, when a target operation is a vehicle drive operation, the fluid power sub-system 46 may be used to power the drive sub-system 122. On the other hand, when a target operation is a fitting swage operation, the fluid power sub-system 46 may be used to power the swage machine 40.

In the depicted example, the integrated deployment system 38A may selectively power the drive sub-system 122 using one or more motors 62 in the fluid power sub-system 46. In other words, in such embodiments, the deployment vehicle 118A may power the drive sub-system 122 using one or more motors 62 in the fluid power sub-system 46 when a target operation to be performed by the deployment vehicle 118A is a vehicle drive operation. On the other hand, in such embodiments, the deployment vehicle 118A may power one or more fluid pumps 64 in the fluid power sub-system 46 using one or more motors 62 in the fluid power sub-system when a target operation to be performed by deployment vehicle 118A is a fitting swage operation.

To facilitate selectively switching between powering the drive sub-system 122 and powering the swage machine 40, a switching device 132A may be coupled between the fluid power sub-system 46, the drive sub-system 122, and the swage machine 40. In particular, in the depicted example, the switching device 132A may be a transmission (e.g., clutch and gearbox) that is implemented and/or operated to selectively connect a motor shaft of one or more motors 62 in the fluid power sub-system 46 to a drive gear 134, which is tied to one or more wheels 124 in the drive sub-system 122, or a pump gear 136, which is tied to one or more fluid pumps 64 in the fluid power sub-system 46. For example, the transmission (e.g., switching device 132A) may connect the motor shaft to the drive gear 134 when a target operation to be performed by the deployment vehicle 118A is a vehicle drive operation. On the other hand, the transmission may connect the motor shaft to the pump gear 136 when a target operation to be performed by the deployment vehicle 118A is a fitting swage operation.

However, it should again be appreciated that the depicted example is merely intended to be illustrative and not limiting. In particular, in other embodiments, a fluid (e.g., hydraulic and/or pneumatic) power sub-system 46 of integrated on a deployment vehicle 118 of an integrated deployment system 38 may be implemented and/or operated to selectively power a drive (e.g., wheel and/or track) sub-system 122 integrated on the deployment vehicle 118 using other techniques. For example, in other embodiments, an integrated deployment system 38 may be implemented and/or operated to power its drive sub-system 122 using one or more actuation fluid flows produced by its fluid power sub-system 46.

Figure 8:
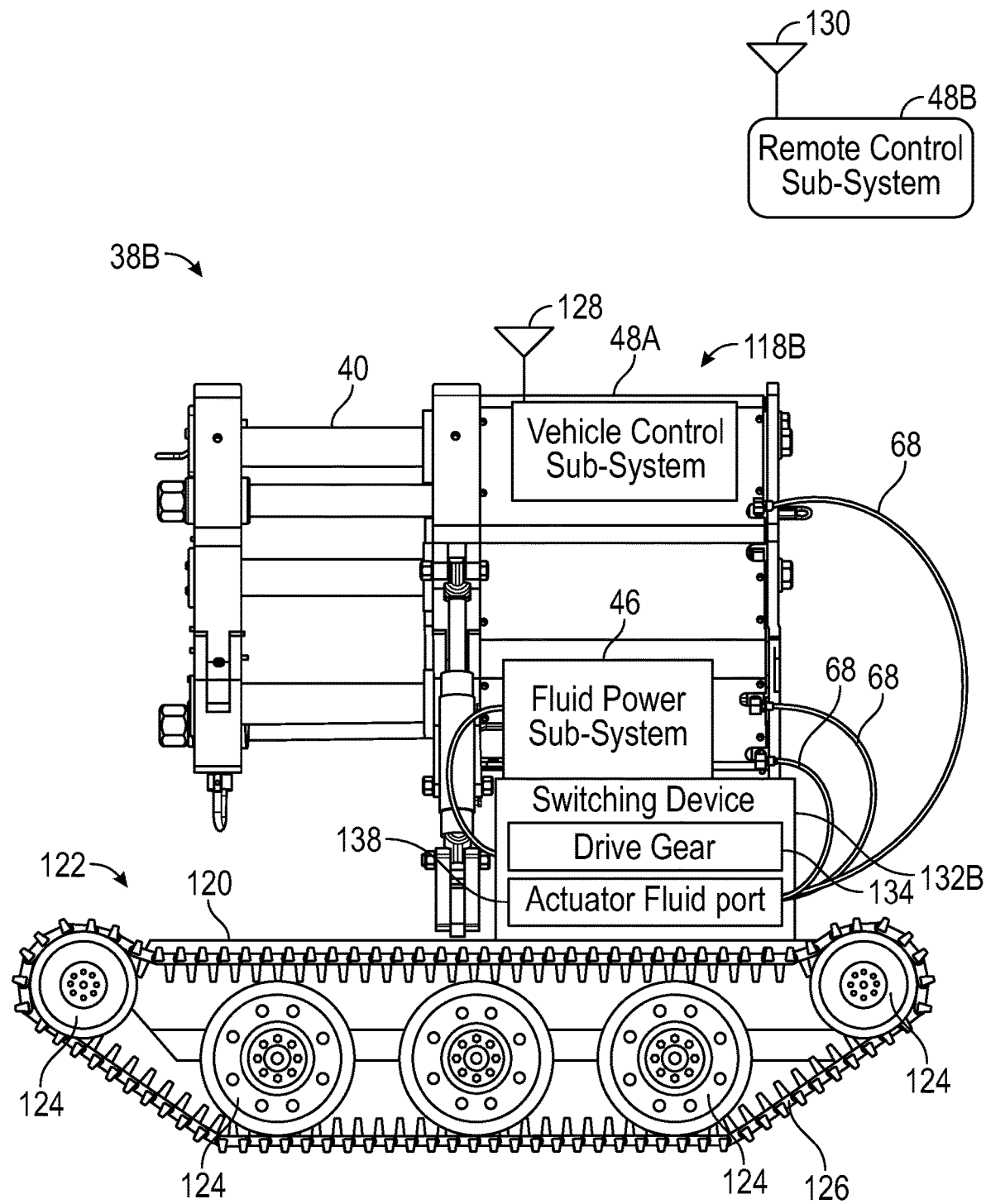
FIG. 8 is a side view of another example of the deployment system of FIG. 4 integrated on a (e.g., remotely operated) deployment vehicle, in accordance with an embodiment of the present disclosure.

To help illustrate, another example of a deployment system 38B, which is integrated on a (e.g., remotely operated) deployment vehicle 118B, is shown in FIG. 8. As depicted, the deployment vehicle 118B includes a vehicle frame 120 and the integrated deployment system 38B includes a drive (e.g., wheel and/or track) sub-system 122, which includes multiple wheels 124 secured to the vehicle frame 120, for example, in addition to one or more tracks 126 disposed around the wheels 124. In some embodiments, the vehicle frame 120 of FIG. 8 may generally match the vehicle frame 120 of FIG. 7, the drive sub-system 122 of FIG. 8 may generally match the drive sub-system 122 of FIG. 7, or both.

In any case, as depicted in FIG. 8, the integrated deployment system 38B includes a swage machine 40 and a fluid (e.g., hydraulic and/or pneumatic) power sub-system 46 implemented on the vehicle frame 120 of the deployment vehicle 118B. In particular, as in the depicted example, the swage machine 40 may be secured directly to the vehicle frame 120. Additionally, as in the depicted example, the fluid power sub-system 46 may be secured to the housing 100 of the swage machine 40.

To enable remotely controlling operation of the deployment vehicle 118B, as in the depicted example, a control sub-system 48 of the integrated deployment system 38B may be divided between a vehicle control sub-system 48A, which is implemented at the deployment vehicle 118B, and a remote (e.g., handheld and/or belly pack) control sub-system 48B, which can be moved away from the deployment vehicle 118B. For example, the vehicle control sub-system 48A may be secured to the housing 100 of the swage machine 40. To facilitate remotely controlling operation using the remote control sub-system 48B, the remote control sub-system 48B may be communicatively coupled to the vehicle control sub-system 48A. For example, as in the depicted example, the vehicle control sub-system 48A may include a vehicle antenna 128 and the remote control sub-system 48B may include a remote antenna 130, which are implemented and/or operated to enable the vehicle control sub-system 48A and the remote control sub-system 48B to communicate via a wireless connection.

However, it should be appreciated that the depicted example is merely intended to be illustrative and not limiting. In particular, in other embodiments, a vehicle control sub-system 48A and a remote control sub-system 48B may additionally or alternatively be implemented and/or operated to communicate via a wired connection. Furthermore, in other embodiments, a drive sub-system 122 of a deployment vehicle 118 may not include a track 126. Moreover, in other embodiments, a deployment vehicle 118 in an integrated deployment system 38 may be an underwater (e.g., submarine) deployment vehicle 118, for example, when used in offshore oil and gas applications.

In any case, as described above, in some embodiments, a fluid (e.g., hydraulic and/or pneumatic) power sub-system 46 integrated on a deployment vehicle 118 may be used to selectively power a drive sub-system 122 integrated on the deployment vehicle 118 as well as selectively powering a swage machine 40 integrated on the deployment vehicle 118, for example, to facilitate obviating a separate motor and, thus, reducing implementation associated cost, such as component count and/or physical footprint (e.g., size), of the deployment vehicle 118. In particular, in the depicted example, the integrated deployment system 38B may selectively power the drive sub-system 122 using one or more actuation fluid flows produced by one or more fluid pumps 64 in the fluid power sub-system 46, for example, instead of directly using one or more motors 62 in the fluid power sub-system 46. In other words, in such embodiments, the deployment vehicle 118B may power the drive sub-system 122 using one or more actuation fluid flows produced by one or more fluid pumps 64 in the fluid power sub-system 46 when a target operation to be performed by the deployment vehicle 118B is a vehicle drive operation. On the other hand, in such embodiments, the deployment vehicle 118B may power one or more swaging fluid actuators 90 in the swage machine 40 using one or more actuation fluid flows produced by one or more fluid pumps 64 in the fluid power sub-system 46 when a target operation to be performed by the deployment vehicle 118B is a fitting swage operation.

To facilitate selectively switching between powering the drive sub-system 122 and powering the swage machine 40, a switching device 132B may be coupled between the fluid power sub-system 46, the drive sub-system 122, and the swage machine 40. In particular, in the depicted example, the switching device 132B may be a directional control valve (DCV), for example, which is coupled in series with another directional control valve that is implemented and/or operated to selectively control supply of actuation fluid to a cap side and/or a piston side of a fluid actuator 44 in the swage machine 40. In such embodiments, the directional control valve (e.g., switching device 132B) may be implemented and/or operated to selectively provide a fluid path to a drive gear 134, which is tied to one or more wheels 124 in the drive sub-system 122, or to an actuator fluid port 138, which is fluidly coupled to one or more fluid actuators 44 in the swage machine 40 via one or more actuation fluid conduits 68. For example, the directional control valve may provide a fluid flow path to the drive gear 134 when a target operation to be performed by the integrated deployment system 38B is a vehicle drive operation. On the other hand, the directional control valve may provide a fluid flow path to the actuator fluid port 138 when a target operation to be performed by the integrated deployment system 38B is a fitting swage operation.

However, it should again be appreciated that the depicted example is merely intended to be illustrative and not limiting. In particular, as described above, in other embodiments, a fluid (e.g., hydraulic and/or pneumatic) power sub-system 46 of an integrated deployment system 38 may be implemented and/or operated to selectively power a drive (e.g., wheel and/or track) sub-system 122 of the integrated deployment system 38 using other techniques. Moreover, as will be described in more detail below, in other embodiments, a deployment system 38 may be integrated on multiple deployment vehicles 118. In any case, at least in some instances, integrating a deployment system 38 on a deployment vehicle 118 in accordance with the techniques described in the present disclosure may facilitate improving operational efficiency of the deployment system 38 and, thus, deployment efficiency of a pipeline system 10 that is deployed using the deployment system 38, for example, due at least in part to the integrated deployment system 38 being able to be moved as a unit instead of as multiple discrete components.

Figure 9:
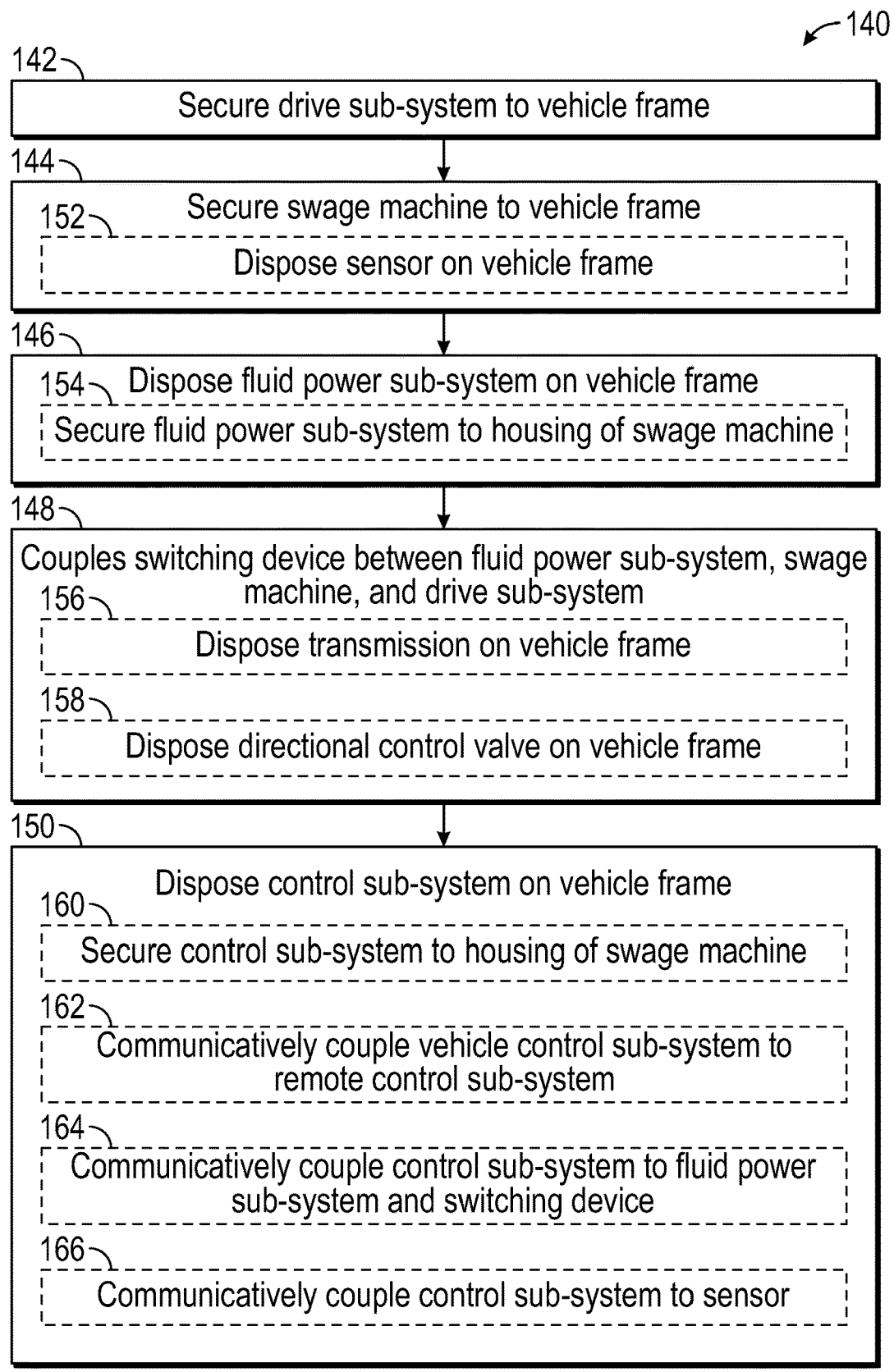
FIG. 9 is flow diagram of an example process for integrating a deployment system on a deployment vehicle, in accordance with an embodiment of the present disclosure.

To help further illustrate, an example of a process 140 for integrating a deployment system 38 on a (e.g., remotely operated) deployment vehicle 118 is described in FIG. 9. Generally, the process 140 includes securing a drive sub-system to a vehicle frame (process block 142), securing a swage machine to the vehicle frame (process block 144), and disposing a fluid power sub-system on the vehicle frame (process block 146). Additionally, the process 140 generally includes coupling a switching device between the fluid power sub-system, the swage machine, and the drive sub-system (process block 148) and disposing a control sub-system on the vehicle frame (process block 150).

Although described in a specific order, which corresponds with an embodiment of the present disclosure, it should be appreciated that the example process 140 is merely intended to be illustrative and not limiting. In particular, in other embodiments, a process 140 for integrating a deployment system 38 on a deployment vehicle 118 may include one or more additional process blocks and/or omit one or more of the depicted process blocks. Additionally or alternatively, in other embodiments, one or more of the depicted process blocks may be performed in a different order, for example, such that the control sub-system 48 is disposed on the vehicle frame 120 before the fluid power sub-system is disposed on the vehicle frame 120.

In any case, as described above, a deployment system 38 that is integrated on a (e.g., remotely operated) deployment vehicle 118 may include a drive sub-system 122, which is implemented to be secured to the vehicle frame 120 of the deployment vehicle 118. As such, implementing the integrated deployment system 38 may include securing a drive sub-system 122 to the vehicle frame 120 of the deployment vehicle 118 (process block 142). In particular, in some embodiments, securing the drive sub-system 122 to the vehicle frame 120 may include securing one or more wheels 124 of the drive sub-system 122 to the vehicle frame 120, for example, in addition to disposing one or more tracks 126 around the one or more wheels 124. To facilitate selectively powering the drive sub-system 122 using a fluid (e.g., hydraulic and/or pneumatic) power sub-system 46 of the integrated deployment system 38, as described above, one or more wheels 124 in the drive sub-system 122 may also be coupled (e.g., tied) to a drive gear 134.

Additionally, as described above, a deployment system 38 that is integrated on a deployment vehicle 118 may include a swage machine 40, which is implemented to be secured directly to the vehicle frame 120 of the deployment vehicle 118. As such, implementing the integrated deployment system 38 may include securing a swage machine 40 directly to the vehicle frame 120 of the deployment vehicle 118 (process block 144). Furthermore, as described above, in some embodiments, one or more sensors 50 may be implemented at the swage machine 40, for example, to facilitate determining (e.g., sensing and/or measuring) one or more operational parameters of the integrated deployment system 38. Thus, in such embodiments, securing the swage machine 40 to the vehicle frame 120 may include disposing one or more sensors 50 on the vehicle frame 120 (process block 152).

Moreover, as described above, a deployment system 38 that is integrated on a deployment vehicle 118 may include a fluid (e.g., hydraulic and/or pneumatic) power sub-system 46, which is implemented to be disposed on the vehicle frame 120 of the deployment vehicle 118. As such, implementing the integrated deployment system 38 may include disposing a fluid power sub-system 46 on the vehicle frame 120 of the deployment vehicle 118 (process block 146). In particular, as described above, in some embodiments, the fluid power sub-system 46 may be implemented to be secured to the housing 100 of a swage machine 40 in the integrated deployment system 38. Thus, in such embodiments, disposing the fluid power sub-system 46 on the vehicle frame 120 may include securing the fluid power sub-system 46 to the housing 100 of a swage machine 40, which is or is to be secured to the vehicle frame 120 of the deployment vehicle 118 (process block 154).

Additionally, to facilitate selectively powering a drive sub-system 122 or a swage machine 40 integrated on a (e.g., remotely operated) deployment vehicle 118, as described above, an integrated deployment system 38 may include a switching device 132, which is implemented to be coupled between the fluid power sub-system 46, the drive sub-system 122, and the swage machine 40. As such, implementing the integrated deployment system 38 may include coupling a switching device 132 between the fluid power sub-system 46, the drive sub-system 122, and the swage machine 40 (process block 148). In other words, implementing the integrated deployment system 38 may include coupling the switching device 132 between the fluid power sub-system 46 and the drive sub-system 122 as well between the fluid power sub-system 46 and the swage machine 40.

As described above, in some embodiments, a switching device 132 implemented in an integrated deployment system 38 may be a transmission (e.g., clutch and gearbox), for example, which is implemented and/or operated to selectively connect a motor shaft of one or more motors 62 in a fluid power sub-system 46 integrated on a deployment vehicle 118 with a drive dear 134, which is tied to one or more wheels 124 in a drive sub-system 122 that is integrated on the deployment vehicle 118, or to a pump gear 136, which is tied to one or more fluid pumps 64 in the fluid power sub-system 46. Thus, in such embodiments, coupling the switching device 132 between the fluid power sub-system 46, the drive sub-system 122, and the swage machine 40 may include disposing a transmission on the vehicle frame 120 of the deployment vehicle 118 (process block 156). In other embodiments, as described above, a switching device 132 implemented in an integrated deployment system 38 may be a directional control valve (DCV), for example, which is implemented and/or operated to selectively provide a fluid flow path from one or more fluid pumps 64 in a fluid power sub-system 46 integrated on a deployment vehicle 118 to a drive gear 134, which is tied to one or more wheels 124 in a drive sub-system 122 that is integrated on the deployment vehicle 118, or to one or more actuator fluid ports 138, which are fluidly coupled to one or more fluid actuators 44 in a swage machine 40 integrated on the deployment vehicle 118 via one or more actuation fluid conduits 68. Thus, in such embodiments, coupling the switching device 132 between the fluid power sub-system 46, the drive sub-system 122, and the swage machine 40 may include disposing a directional control valve on the vehicle frame 120 of the deployment vehicle 118, for example, such that direction control valve is coupled in series with another directional control valve that is implemented and/or operated to selectively control supply of actuation fluid to a cap side and/or a piston side of a fluid actuator 44 in the swage machine 40 (process block 158).

In any case, as described above, an integrated deployment system 38 may additionally include a control sub-system 48, which is implemented and/or operated to generally control operation of the integrated deployment system 38 and, thus, a (e.g., remotely operated) deployment vehicle 118 in the integrated deployment system 38. To enable remotely controlling operation of a deployment vehicle 118, as described above, in some embodiments, a control sub-system 48 of an integrated deployment system 38 may be divided into a vehicle control sub-system 48A, which is implemented to be deployed at the deployment vehicle 118, and a remote control sub-system 48B, which can be moved away from the deployment vehicle 118. As such, implementing the integrated deployment system 38 may include disposing the control sub-system 48 at least partially on the vehicle frame 120 of the deployment vehicle 118 (process block 150).

More specifically, as described above, in some embodiments, a vehicle control sub-system 48A of an integrated deployment system 38 may be implemented to be secured to the housing 100 of a swage machine 40, which is or is to be secured to the vehicle frame 120 of a deployment vehicle 118. In other words, in such embodiments, disposing the control sub-system 48 on the vehicle frame 120 may include securing the vehicle control sub-system 48A to the housing 100 of the swage machine 40 (process block 160). Additionally, to enable a user (e.g., operator), such as service technician, to remotely control operation of the deployment vehicle 118 using the remote control sub-system 48B, the vehicle control sub-system 48A may be communicatively coupled to the remote control sub-system 48B, for example, via a wireless connection and/or a wireless connection (process block 162).

Moreover, as described above, a control sub-system 48 of an integrated deployment system 38 may generally control operation of equipment in the integrated deployment system 38 based at least in part on one or more operational parameters determined (e.g., sensed and/or measured) by one or more sensors 50 in the integrated deployment system 38. To enable the control sub-system 48 to control operation, the control sub-system 48 may be communicatively coupled to the fluid power sub-system 46 and the switching device 132, which is coupled between the fluid power sub-system 46, the drive sub-system 122, and the swage machine 40, for example, via a wireless connection and/or a wired connection (process block 164). Additionally, the control sub-system 48 may be communicative coupled to one or more sensors 50 in the integrated deployment system 38, for example, via a wireless connection and/or a wired connection (process block 166).

In this manner, a deployment system 38 may be integrated on a (e.g., remotely operated) deployment vehicle 118. However, it should again be appreciated that the above examples are merely intended to be illustrative and not limiting. In particular, in other embodiments, a deployment system 38 may be integrated on multiple different deployment vehicles 118.

Figure 10:
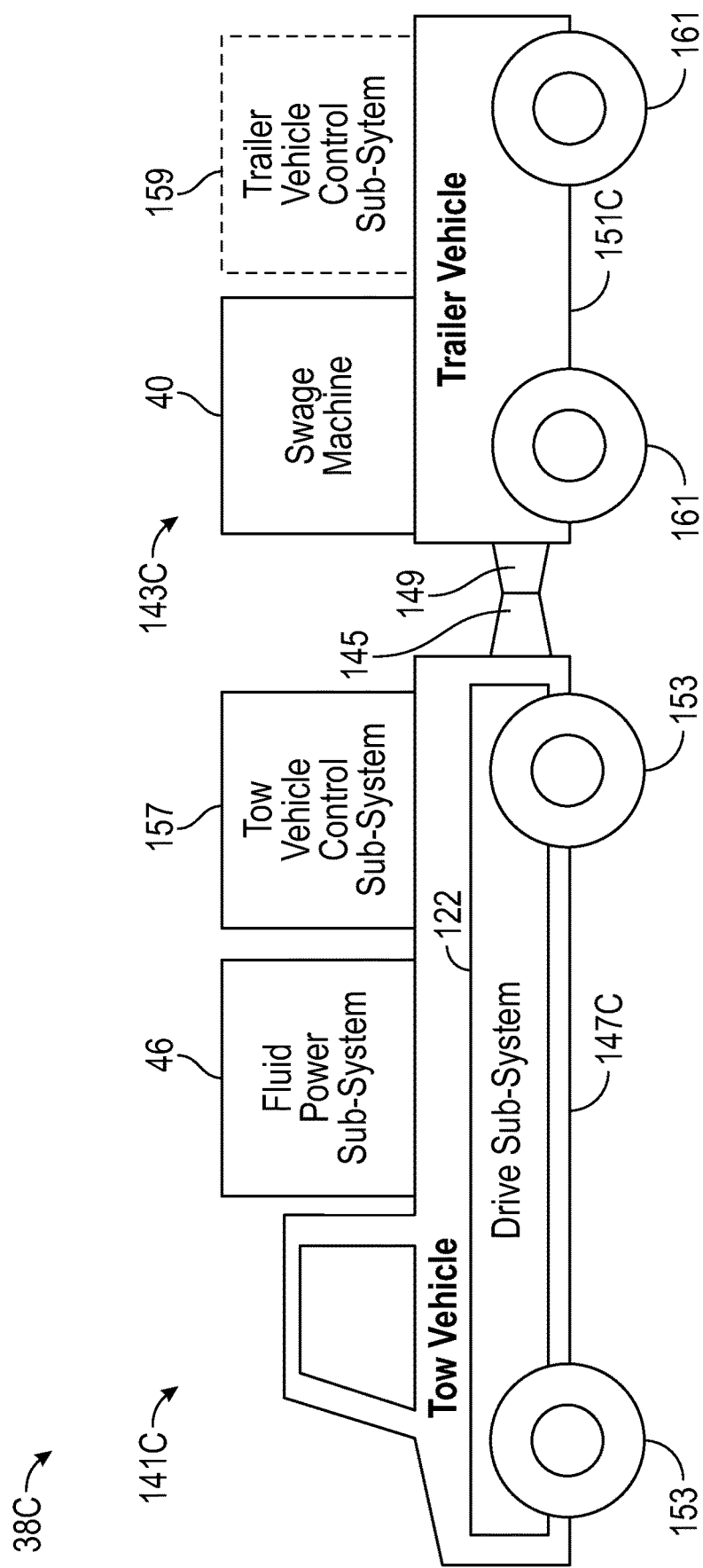
FIG. 10 is a side view on another example of the deployment system of FIG. 4 that is integrated on multiple deployment vehicles, in accordance with an embodiment of the present disclosure.

To help illustrate, an example of a deployment system 38C integrated on multiple deployment vehicles 118—namely a tow vehicle 141C and a trailer vehicle 143C—is shown in FIG. 10. As depicted, the tow vehicle 141C includes a hitch assembly 145 secured to its vehicle frame 120—namely a tow vehicle frame 147C—and the trailer vehicle 143C includes a tongue assembly 149 secured to its vehicle frame 120—namely a trailer vehicle frame 151C. In particular, as depicted, the hitch assembly 145 and the tongue assembly 149 are implemented to enable the tow vehicle 141C to be secured to the trailer vehicle 143C and, thus, to tow (e.g., move) the trailer vehicle 143C.

In addition to the hitch assembly 145, as depicted, the integrated deployment system 38C includes a fluid (e.g., hydraulic and/or pneumatic) power sub-system 46 and a drive (e.g., wheel and/or track) sub-system 122 disposed on the tow vehicle frame 147C. In particular, as depicted, the drive sub-system 122 may include wheels 124—namely tow vehicle wheels 153—secured to the tow vehicle frame 147C. Additionally, although integrated on multiple deployment vehicles 118, in some embodiments, the integrated deployment system 38C may nevertheless be implemented to enable the fluid power sub-system 46 to selectively power the drive sub-system 122, for example, when a target operation to be performed by the integrated deployment system 38C is a vehicle drive operation.

Furthermore, as depicted, at least a portion of a control sub-system 48—namely a tow vehicle control sub-system 157—is disposed on the tow vehicle frame 147C. In particular, the tow vehicle control sub-system 157 may be implemented and/or operated to generally control operation of the tow vehicle 141C. In fact, in some embodiments, the tow vehicle control sub-system 157 may additionally be implemented and/or operated to facilitate controlling operation of the trailer vehicle 151C.

However, it should be appreciated that the depicted example is merely intended to be illustrative and not limiting. In particular, as described above, in some embodiments, a control sub-system 48 of an integrated deployment system 38 may additionally include a remote control sub-system 48B, which is communicatively coupled to a vehicle control sub-system 48A, such as a tow vehicle control sub-system 157, of a deployment vehicle 118, for example, to enable a user (e.g., operator), such as a service technician, to remotely monitor and/or control operation of the deployment vehicle 118. Moreover, in some embodiments, a portion of a control sub-system 48 in an integrated deployment system 38—namely a trailer vehicle control sub-system 159—may be disposed on a trailer vehicle frame 151 of a trailer vehicle 143.

In any case, as depicted, the integrated deployment system 38C includes a swage machine 40 disposed on the trailer vehicle frame 151C of the trailer vehicle 143C. In particular, in some embodiments, the swage machine 40 may be secured directly to the trailer vehicle frame 151C. In fact, although the fluid power sub-system 46 is disposed on the tow vehicle frame 147C, in some embodiments, the integrated deployment system 38C may nevertheless be implemented and/or operated to enable the fluid power sub-system 46 to selectively power operation of the swage machine 40, for example, at least in part via actuation fluid conduits 68 fluidly coupled between the tow vehicle 141C and the trailer vehicle 143C.

In any case, as described above, the tongue assembly 149 of the trailer vehicle 143C may be secured to the hitch assembly 145 of the tow vehicle 141C to enable the trailer vehicle 143C to tow (e.g., move) the trailer vehicle 143C. To facilitate moving the trailer vehicle 143C, as in the depicted example, one or more wheels 124—namely trailer wheels 161—may be secured to the trailer vehicle frame 151C. In this manner, a deployment system 38 may be integrated on multiple deployment vehicles 118 while still enabling the integrated deployment system 38 to be moved as a unit, which, at least in some instances, may facilitate improving operational efficiency of the integrated deployment system 38 and, thus, deployment efficiency of a pipeline system 10 that is deployed using the integrated deployment system 38.

Figure 11:
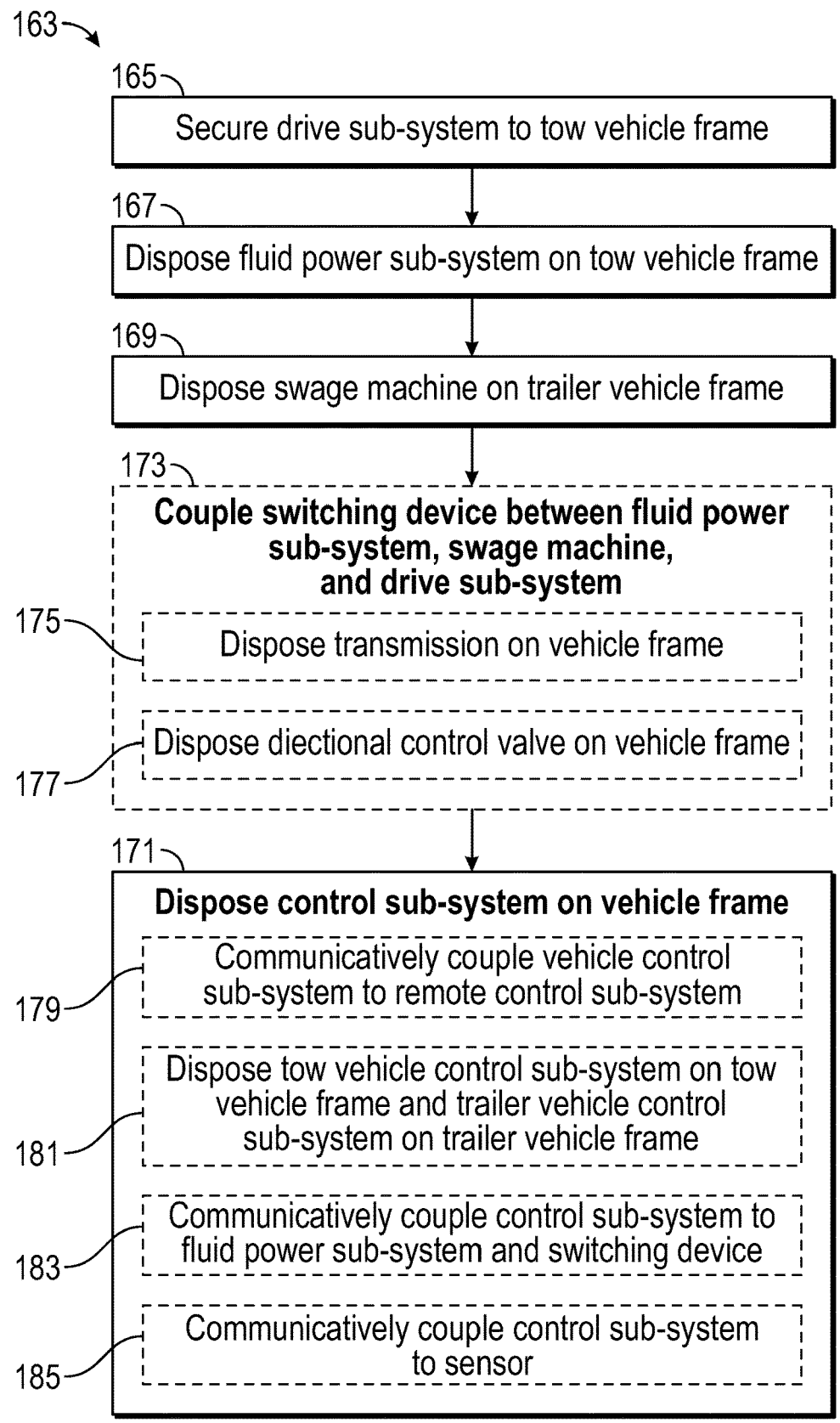
FIG. 11 is a flow diagram of an example process for integrating a deployment system on multiple deployment vehicles, in accordance with an embodiment of the present disclosure.

To help further illustrate, an example of a process 163 for integrating a deployment system 38 on multiple (e.g., remotely operated) deployment vehicles 118 is described in FIG. 11. Generally, the process 163 includes securing a drive sub-system to a tow vehicle frame (process block 165) and disposing a fluid power sub-system on the tow vehicle frame (process block 167). Additionally, the process 163 generally includes disposing a swage machine on a trailer vehicle frame (process block 169) and disposing a control sub-system on a vehicle frame (process block 171).

Although described in a specific order, which corresponds with an embodiment of the present disclosure, it should be appreciated that the example process 163 is merely intended to be illustrative and not limiting. In particular, in other embodiments, a process 163 for integrating a deployment system 38 on multiple deployment vehicles 118 may include one or more additional process blocks and/or omit one or more of the depicted process blocks. For example, some embodiments of the process 163 may include coupling a switching device 132 between the fluid power sub-system 46, the swage machine 40, and the drive sub-system 122 while other embodiments of the process 163 do not. Moreover, in other embodiments, one or more of the depicted process blocks may be performed in a different order, for example, such that the swage machine 40 is disposed on the trailer vehicle frame 151 before the fluid power sub-system 46 is disposed on the tow vehicle frame 147.

In any case, as described above, a deployment system 38 that is integrated on multiple (e.g., remotely operated) deployment vehicles 118 may include a drive sub-system 122, which is implemented to be secured to the tow vehicle frame 147 of a tow vehicle 141 (e.g., deployment vehicle 118). As such, implementing the integrated deployment system 38 may include securing a drive sub-system 122 to the tow vehicle frame 147 (process block 165). In particular, in some embodiments, securing the drive sub-system 122 to the tow vehicle frame 147 may include securing tow vehicle wheels 153 of the drive sub-system 122 to the tow vehicle frame 147, for example, in addition to disposing one or more tracks 126 around the tow vehicle wheels 153. To facilitate selectively powering the drive sub-system 122 using a fluid (e.g., hydraulic and/or pneumatic) power sub-system 46 of the integrated deployment system 38, as described above, one or more tow vehicle wheels 153 in the drive sub-system 122 may also be coupled (e.g., tied) to a drive gear 134.

Additionally, as described above, a deployment system 38 that is integrated on multiple deployment vehicles 118 may include a fluid (e.g., hydraulic and/or pneumatic) power sub-system 46, which is implemented to be disposed on the tow vehicle frame 147 of a tow vehicle 131. As such, implementing the integrated deployment system 38 may include disposing a fluid power sub-system 46 on the tow vehicle frame 147 (process block 167). In particular, in some embodiments, the fluid power sub-system 46 may be secured directly to the tow vehicle frame 147.

Furthermore, as described above, a deployment system 38 that is integrated on multiple deployment vehicles 118 may include a swage machine 40, which is implemented to be disposed on a trailer vehicle frame 151 of a trailer vehicle 143 (e.g., deployment vehicle 118). As such, implementing the integrated deployment system 38 may include disposing a swage machine 40 on the trailer vehicle frame 151 (process block 167). In particular, in some embodiments, the swage machine 40 may be secured directly to the trailer vehicle frame 151.

Moreover, to facilitate selectively powering a drive sub-system 122 or a swage machine 40, in some embodiments, a deployment system 38 that is integrated on multiple deployment vehicles 118 may include a switching device 132, which is implemented to be coupled between the fluid power sub-system 46, the drive sub-system 122, and the swage machine 40. Thus, in such embodiments, implementing the integrated deployment system 38 may include coupling a switching device 132 between the fluid power sub-system 46, the drive sub-system 122, and the swage machine 40 (process block 173). In other words, in such embodiments, implementing the integrated deployment system 38 may include coupling the switching device 132 between the fluid power sub-system 46 and the drive sub-system 122 as well between the fluid power sub-system 46 and the swage machine 40.

In particular, as described above, in some such embodiments, a switching device 132 in an integrated deployment system 38 may be a transmission (e.g., clutch and gearbox), for example, which is implemented and/or operated to selectively connect a motor shaft of one or more motors 62 in a fluid power sub-system 46 with a drive dear 134, which is tied to one or more wheels 124 in a drive sub-system 122, or to a pump gear 136, which is tied to one or more fluid pumps 64 in the fluid power sub-system 46. Thus, in such embodiments, coupling the switching device 132 between the fluid power sub-system 46, the drive sub-system 122, and the swage machine 40 may include disposing a transmission on a vehicle frame 120, such as the tow vehicle frame 147 or the trailer vehicle frame 151 (process block 175). In other such embodiments, as described above, a switching device 132 in an integrated deployment system 38 may be a directional control valve (DCV), for example, which is implemented and/or operated to selectively provide a fluid flow path from one or more fluid pumps 64 in a fluid power sub-system 46 to a drive gear 134, which is tied to one or more wheels 124 in a drive sub-system 122, or to one or more actuator fluid ports 138, which are fluidly coupled to one or more fluid actuators 44 in a swage machine 40 via one or more actuation fluid conduits 68. Thus, in such embodiments, coupling the switching device 132 between the fluid power sub-system 46, the drive sub-system 122, and the swage machine 40 may include disposing a directional control valve on a vehicle frame 120, such as the tow vehicle frame 147 or the trailer vehicle frame 151, for example, such that direction control valve is coupled in series with another directional control valve that is implemented and/or operated to selectively control supply of actuation fluid to a cap side and/or a piston side of a fluid actuator 44 in the swage machine 40 (process block 177).

In any case, as described above, a deployment system 38 that is integrated on multiple deployment vehicles 118 may additionally include a control sub-system 48, which is implemented and/or operated to generally control operation of the integrated deployment system 38 and, thus, the (e.g., remotely operated) deployment vehicles 118 in the integrated deployment system 38. To enable remotely controlling operation of a deployment vehicle 118, as described above, in some embodiments, a control sub-system 48 of an integrated deployment system 38 may be divided into a vehicle control sub-system 48A, which is implemented to be deployed at the deployment vehicle 118, and a remote control sub-system 48B, which can be moved away from the deployment vehicle 118. As such, implementing the integrated deployment system 38 may include disposing at least a portion of a control sub-system 48—namely a vehicle control sub-system 48A—on a vehicle frame 120, such as the tow vehicle frame 147 or the trailer vehicle frame 151 (process block 171). In particular, to enable a user (e.g., operator), such as service technician, to remotely monitor and/or control operation of one or more deployment vehicles 118 using the remote control sub-system 48B, in some embodiments, the vehicle control sub-system 48A may be communicatively coupled to the remote control sub-system 48B, for example, via a wireless connection and/or a wireless connection (process block 179).

Furthermore, as described above, in some embodiments, a vehicle control sub-system 48A of a deployment system 38 that is integrated on multiple deployment vehicles 118 may be divided into a tow vehicle control sub-system 157, which is implemented to be disposed on the tow vehicle frame 147 of a tow vehicle 141 (e.g., deployment vehicle 118), and a trailer vehicle control sub-system 159, which is implemented to be disposed on the trailer vehicle frame 151 of a trailer vehicle 143 (e.g., deployment vehicle 118). Thus, in such embodiments, disposing the control sub-system 48 in the integrated deployment system 38 may include disposing a tow vehicle control sub-system 157 on the tow vehicle frame 147 and disposing a trailer vehicle control sub-system 159 on the trailer vehicle frame 151 (process block 181). Additionally, to facilitate coordinating operation of the tow vehicle 141 and the trailer vehicles 143, in some such embodiments, the tow vehicle control sub-system 157 and the trailer vehicle control sub-system 159 may be communicatively coupled, for example, via a wireless connection and/or a wireless connection.

Moreover, as described above, in some embodiments, a control sub-system 48 of an integrated deployment system 38 may generally control operation of equipment in the integrated deployment system 38 based at least in part on one or more operational parameters determined (e.g., sensed and/or measured) by one or more sensors 50 in the integrated deployment system 38. To enable the control sub-system 48 to control operation, in such embodiments, the control sub-system 48 may be communicatively coupled to the fluid power sub-system 46 and the switching device 132, which is coupled between the fluid power sub-system 46, the drive sub-system 122, and the swage machine 40, for example, via a wireless connection and/or a wired connection (process block 183). Additionally, in such embodiments, the control sub-system 48 may be communicative coupled to one or more sensors 50 in the integrated deployment system 38, for example, via a wireless connection and/or a wired connection (process block 185).

In this manner, a deployment system 38 may be integrated on multiple (e.g., remotely operated) deployment vehicles 118, for example, while still enabling the integrated deployment system 38 to be moved as a unit. However, it should again be appreciated that the above examples are merely intended to be illustrative and not limiting. In particular, in other embodiments, a deployment system 38 may be integrated on multiple different deployment vehicles 118 with a different configuration.

Figure 12:
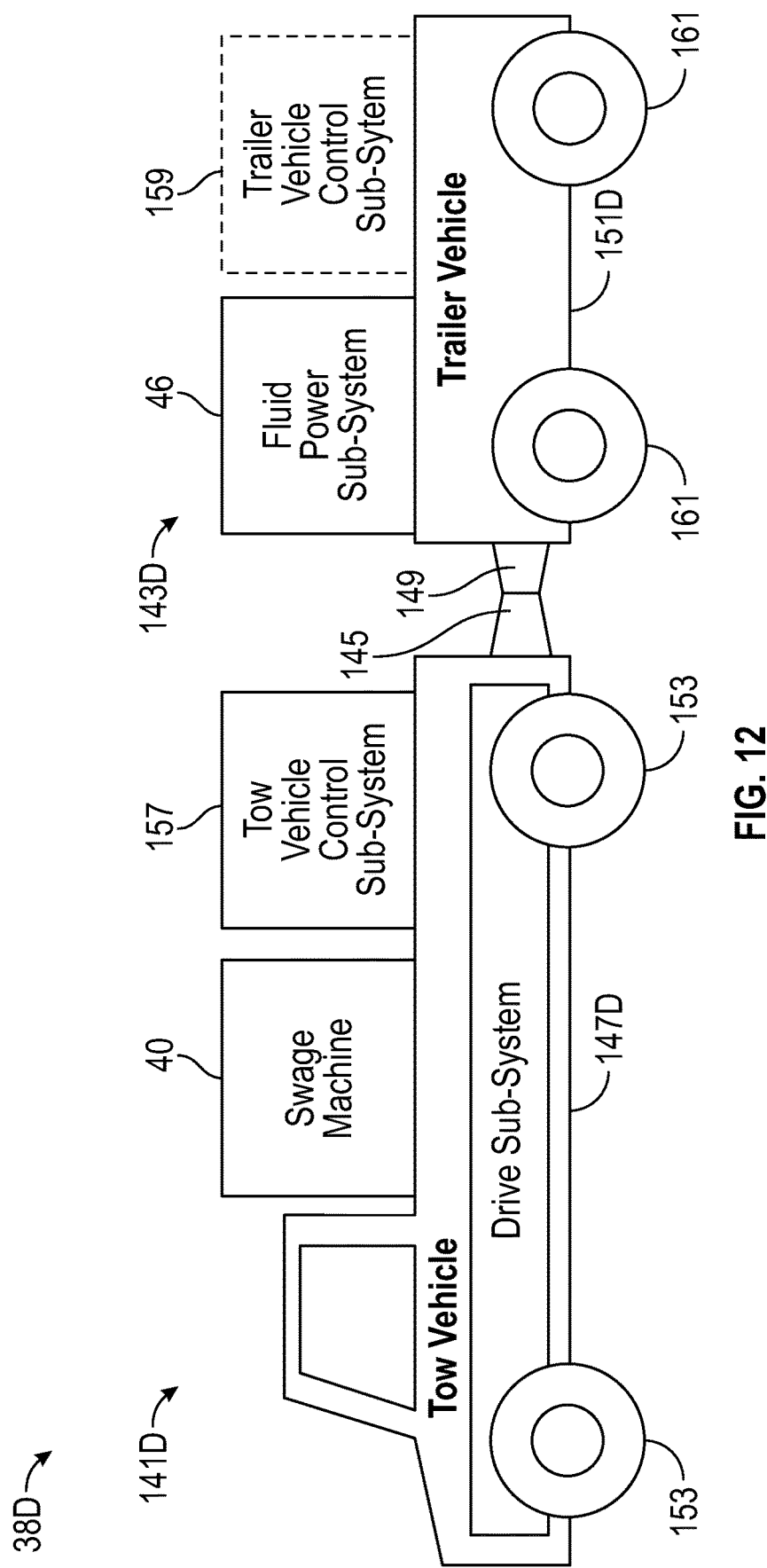
FIG. 12 is a side view of another example of the deployment system of FIG. 4 that is integrated on multiple deployment vehicles, in accordance with an embodiment of the present disclosure.

To help illustrate, another example of a deployment system 38D integrated on multiple deployment vehicles 118—namely a tow vehicle 141D and a trailer vehicle 143D—is shown in FIG. 12. As depicted, the tow vehicle 141D includes a hitch assembly 145 secured to its vehicle frame 120—namely a tow vehicle frame 147D—and the trailer vehicle 143D includes a tongue assembly 149 secured to its vehicle frame 120—namely a trailer vehicle frame 151D. In particular, as depicted, the hitch assembly 145 and the tongue assembly 149 are implemented to enable the tow vehicle 141C to be secured to the trailer vehicle 143C and, thus, to tow (e.g., move) the trailer vehicle 143C. In fact, in some embodiments, the hitch assembly 145 of the integrated deployment system 38D in FIG. 12 may generally match the hitch assembly 145 of the integrated deployment system 38C in FIG. 11, the tongue assembly 149 of the integrated deployment system 38D in FIG. 12 may generally match the tongue assembly 145 of the integrated deployment system 38C in FIG. 11, or both.

However, as depicted in FIG. 12, in addition to the hitch assembly 145 and a drive (e.g., wheel and/or track) sub-system 122, the integrated deployment system 38D includes a swage machine 40 disposed on the tow vehicle frame 147D. In particular, as depicted, the drive sub-system 122 may include wheels 124—namely tow vehicle wheels 153—secured to the tow vehicle frame 147D. Furthermore, as depicted, the integrated deployment system 38D includes a fluid (e.g., hydraulic and/or pneumatic) power sub-system 46 disposed on the trailer vehicle frame 151D of the trailer vehicle 143D. In particular, in some embodiments, the fluid power sub-system 46 may be secured directly to the trailer vehicle frame 151D. Although disposed on different vehicle frames 120, in some embodiments, the integrated deployment system 38D may nevertheless be implemented and/or operated to enable the fluid power sub-system 46 to selectively power operation of the drive sub-system 122 or the swage machine 40, for example, based at least in part on a target operation to be performed by the integrated deployment system 38D.

Moreover, as depicted, at least a portion of a control sub-system 48—namely a tow vehicle control sub-system 157—is disposed on the tow vehicle frame 147D. In particular, the tow vehicle control sub-system 157 may be implemented and/or operated to generally control operation of the tow vehicle 141D. In fact, in some embodiments, the tow vehicle control sub-system 157 may additionally be implemented and/or operated to facilitate controlling operation of the trailer vehicle 151D.

However, it should be appreciated that the depicted example is merely intended to be illustrative and not limiting. In particular, as described above, in some embodiments, a control sub-system 48 of an integrated deployment system 38 may additionally include a remote control sub-system 48B, which is communicatively coupled to a vehicle control sub-system 48A, such as a tow vehicle control sub-system 157, of a deployment vehicle 118, for example, to enable a user (e.g., operator), such as a service technician, to remotely monitor and/or control operation of the deployment vehicle 118. Moreover, in some embodiments, a portion of a control sub-system 48 in an integrated deployment system 38—namely a trailer vehicle control sub-system 159—may be disposed on a trailer vehicle frame 151 of a trailer vehicle 143.

In any case, as described above, the tongue assembly 149 of the trailer vehicle 143D may be secured to the hitch assembly 145 of the tow vehicle 141D to enable the trailer vehicle 143D to tow (e.g., move) the trailer vehicle 143D. To facilitate moving the trailer vehicle 143D, as in the depicted example, one or more wheels 124—namely trailer wheels 161—may be secured to the trailer vehicle frame 151D. In this manner, a deployment system 38 may be integrated on multiple deployment vehicles 118, for example, while still enabling the integrated deployment system 38 to be moved as a unit.

Figure 13:
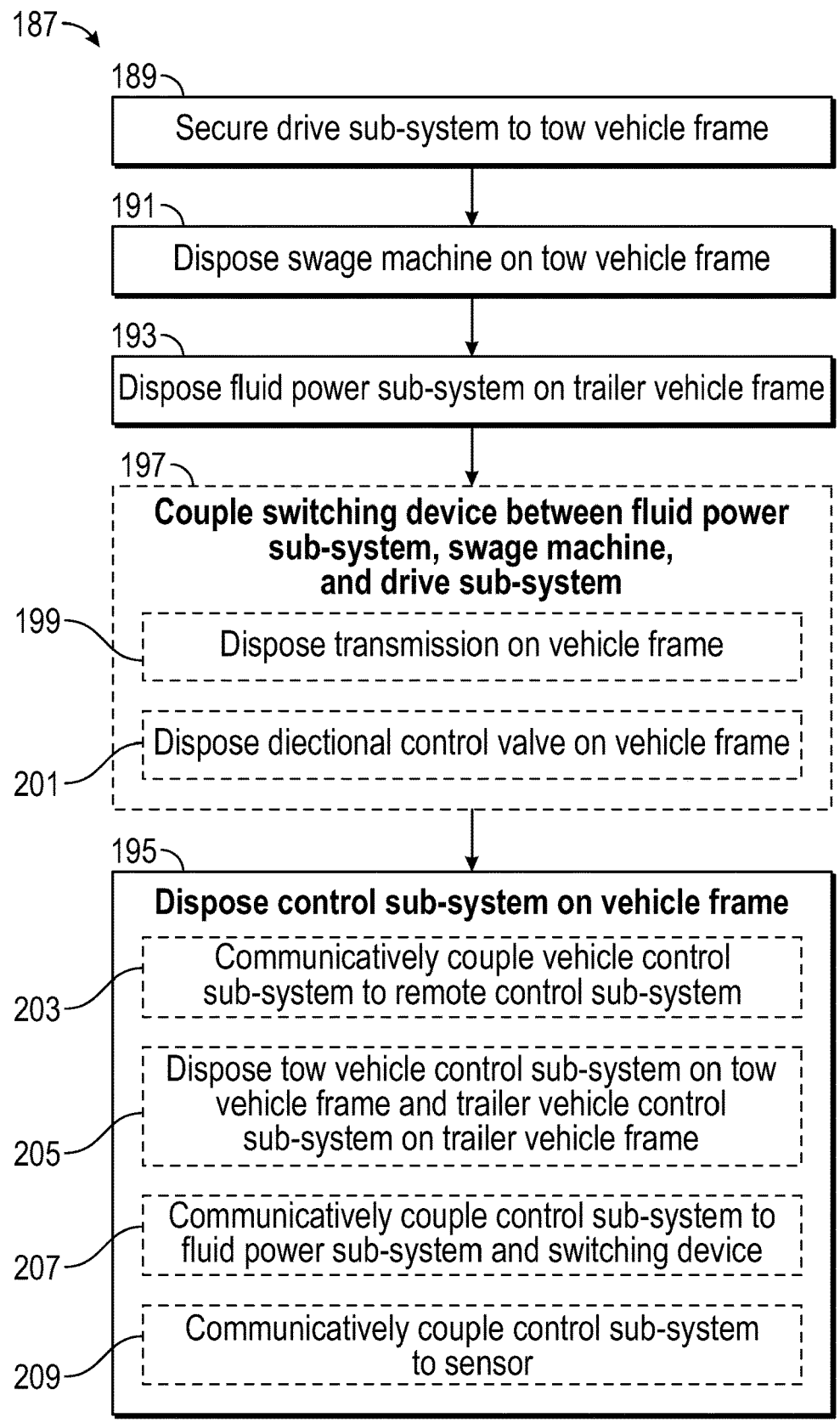
FIG. 13 is a flow diagram of another example process for integrating a deployment system on multiple deployment vehicles, in accordance with an embodiment of the present disclosure.

To help further illustrate, another example of a process 187 for integrating a deployment system 38 on multiple deployment vehicles 118 is described in FIG. 13. Generally, the process 187 includes securing a drive sub-system to a tow vehicle frame (process block 189) and disposing a swage machine on the tow vehicle frame (process block 191). Additionally, the process 187 generally includes disposing a fluid power sub-system on a trailer vehicle frame (process block 193) and disposing a control sub-system on a vehicle frame (process block 195).

Although described in a specific order, which corresponds with an embodiment of the present disclosure, it should be appreciated that the example process 187 is merely intended to be illustrative and not limiting. In particular, in other embodiments, a process 187 for integrating a deployment system 38 on multiple deployment vehicles 118 may include one or more additional process blocks and/or omit one or more of the depicted process blocks. For example, some embodiments of the process 187 may include coupling a switching device 132 between the fluid power sub-system 46, the swage machine 40, and the drive sub-system 122 while other embodiments of the process 163 do not. Moreover, in other embodiments, one or more of the depicted process blocks may be performed in a different order, for example, such that the fluid power sub-system 46 is disposed on the trailer vehicle frame 151 before the swage machine 40 is disposed on the tow vehicle frame 147.

In any case, as described above, a deployment system 38 that is integrated on multiple (e.g., remotely operated)

deployment vehicles 118 may include a drive sub-system 122, which is implemented to be secured to the tow vehicle frame 147 of a tow vehicle 141 (e.g., deployment vehicle 118). As such, implementing the integrated deployment system 38 may include securing a drive sub-system 122 to the tow vehicle frame 147 (process block 189). In particular, in some embodiments, securing the drive sub-system 122 to the tow vehicle frame 147 may include securing tow vehicle wheels 153 of the drive sub-system 122 to the tow vehicle frame 147, for example, in addition to disposing one or more tracks 126 around the tow vehicle wheels 153. To facilitate selectively powering the drive sub-system 122 using a fluid (e.g., hydraulic and/or pneumatic) power sub-system 46 of the integrated deployment system 38, as described above, one or more tow vehicle wheels 153 in the drive sub-system 122 may also be coupled (e.g., tied) to a drive gear 134.

Additionally, as described above, a deployment system 38 that is integrated on multiple deployment vehicles 118 may include a swage machine 40, which is implemented to be disposed on the tow vehicle frame 147 of a tow vehicle 131. As such, implementing the integrated deployment system 38 may include disposing a swage machine 40 on the tow vehicle frame 147 (process block 191). In particular, in some embodiments, the swage machine 40 may be secured directly to the tow vehicle frame 147.

Furthermore, as described above, a deployment system 38 that is integrated on multiple deployment vehicles 118 may include a fluid (e.g., hydraulic and/or pneumatic) power sub-system 46, which is implemented to be disposed on a trailer vehicle frame 151 of a trailer vehicle 143 (e.g., deployment vehicle 118). As such, implementing the integrated deployment system 38 may include disposing a fluid power sub-system 46 on the trailer vehicle frame 151 (process block 193). In particular, in some embodiments, the fluid power sub-system 46 may be secured directly to the trailer vehicle frame 151.

Moreover, as described above, in some such embodiments, a switching device 132 in an integrated deployment system 38 may be a transmission (e.g., clutch and gearbox), for example, which is implemented and/or operated to selectively connect a motor shaft of one or more motors 62 in a fluid power sub-system 46 with a drive dear 134, which is tied to one or more wheels 124 in a drive sub-system 122, or to a pump gear 136, which is tied to one or more fluid pumps 64 in the fluid power sub-system 46. Thus, in such embodiments, coupling the switching device 132 between the fluid power sub-system 46, the drive sub-system 122, and the swage machine 40 may include disposing a transmission on a vehicle frame 120, such as the tow vehicle frame 147 or the trailer vehicle frame 151 (process block 199). In other such embodiments, as described above, a switching device 132 in an integrated deployment system 38 may be a directional control valve (DCV), for example, which is implemented and/or operated to selectively provide a fluid flow path from one or more fluid pumps 64 in a fluid power sub-system 46 to a drive gear 134, which is tied to one or more wheels 124 in a drive sub-system 122, or to one or more actuator fluid ports 138, which are fluidly coupled to one or more fluid actuators 44 in a swage machine 40 via one or more actuation fluid conduits 68. Thus, in such embodiments, coupling the switching device 132 between the fluid power sub-system 46, the drive sub-system 122, and the swage machine 40 may include disposing a directional control valve on a vehicle frame 120, such as the tow vehicle frame 147 or the trailer vehicle frame 151, for example, such that direction control valve is coupled in series with another directional control valve that is implemented and/or operated to selectively control supply of actuation fluid to a cap side and/or a piston side of a fluid actuator 44 in the swage machine 40 (process block 201).

In any case, as described above, a deployment system 38 that is integrated on multiple deployment vehicles 118 may additionally include a control sub-system 48, which is implemented and/or operated to generally control operation of the integrated deployment system 38 and, thus, the (e.g., remotely operated) deployment vehicles 118 in the integrated deployment system 38. To enable remotely controlling operation of a deployment vehicle 118, as described above, in some embodiments, a control sub-system 48 of an integrated deployment system 38 may be divided into a vehicle control sub-system 48A, which is implemented to be deployed at the deployment vehicle 118, and a remote control sub-system 48B, which can be moved away from the deployment vehicle 118. As such, implementing the integrated deployment system 38 may include disposing at least a portion of a control sub-system 48—namely a vehicle control sub-system 48A—on a vehicle frame 120, such as the tow vehicle frame 147 or the trailer vehicle frame 151 (process block 195). In particular, to enable a user (e.g., operator), such as service technician, to remotely monitor and/or control operation of one or more deployment vehicles 118 using the remote control sub-system 48B, in some embodiments, the vehicle control sub-system 48A may be communicatively coupled to the remote control sub-system 48B, for example, via a wireless connection and/or a wireless connection (process block 203).

Furthermore, as described above, in some embodiments, a vehicle control sub-system 48A of a deployment system 38 that is integrated on multiple deployment vehicles 118 may be divided into a tow vehicle control sub-system 157, which is implemented to be disposed on the tow vehicle frame 147 of a tow vehicle 141 (e.g., deployment vehicle 118), and a trailer vehicle control sub-system 159, which is implemented to be disposed on the trailer vehicle frame 151 of a trailer vehicle 143 (e.g., deployment vehicle 118). Thus, in such embodiments, disposing the control sub-system 48 in the integrated deployment system 38 may include disposing a tow vehicle control sub-system 157 on the tow vehicle frame 147 and disposing a trailer vehicle control sub-system 159 on the trailer vehicle frame 151 (process block 205). Moreover, to facilitate coordinating operation of the tow vehicle 141 and the trailer vehicles 143, in some such embodiments, the tow vehicle control sub-system 157 and the trailer vehicle control sub-system 159 may be communicatively coupled, for example, via a wireless connection and/or a wireless connection.

Moreover, as described above, in some embodiments, a control sub-system 48 of an integrated deployment system 38 may generally control operation of equipment in the integrated deployment system 38 based at least in part on one or more operational parameters determined (e.g., sensed and/or measured) by one or more sensors 50 in the integrated deployment system 38. To enable the control sub-system 48 to control operation, in such embodiments, the control sub-system 48 may be communicatively coupled to the fluid power sub-system 46 and the switching device 132, which is coupled between the fluid power sub-system 46, the drive sub-system 122, and the swage machine 40, for example, via a wireless connection and/or a wired connection (process block 207). Additionally, in such embodiments, the control sub-system 48 may be communicatively coupled to one or more sensors 50 in the integrated deployment system 38, for example, via a wireless connection and/or a wired connection (process block 209). In this manner, a deployment system 38 may be integrated on multiple (e.g., remotely operated) deployment vehicles 118, for example, while still enabling the integrated deployment system 38 to be moved as a unit.

In any case, as described above, at least in some instances, implementing an integrated deployment system 38 on one or more deployment vehicles 118 in accordance with the techniques described in the present disclosure may facilitate improving operational efficiency of the integrated deployment system 38 and, thus, deployment efficiency of a pipeline system 10 that the integrated deployment system 38 is used to deploy, for example, at least in part by enabling the integrated deployment system 38 to be moved as a unit. Moreover, as described above, implementing an integrated deployment system 38 one or more deployment vehicles 118 in accordance with the techniques described in the present disclosure may enable a fluid (e.g., hydraulic and/or pneumatic) power sub-system 46 of the integrated deployment system 38 to selectively power a drive sub-system 46 or a swage machine 40, which, at least in some instances, may facilitate reducing implementation associated cost of the integrated deployment system 38, for example, at least in part by obviating one or more other motors and, thus, enabling a reduction in component count and/or physical footprint (e.g., size) of the integrated deployment system 38.

Figure 14:
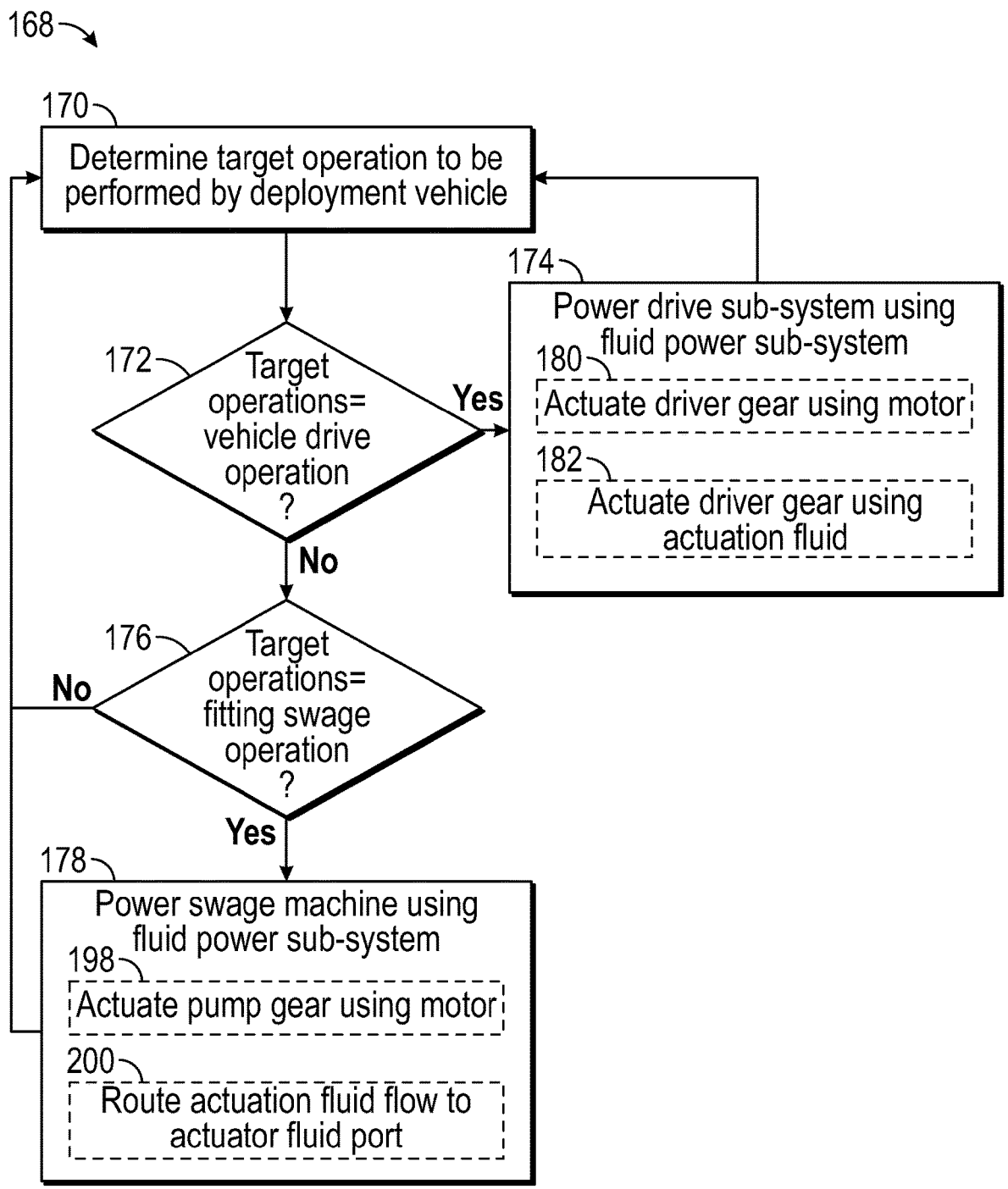
FIG. 14 is a flow diagram of an example process for operating an integrated deployment system, in accordance with an embodiment of the present disclosure.

To help illustrate, an example of a process 168 for operating a deployment system 38 integrated on one or more (e.g., remotely operated) deployment vehicles 118 is described in FIG. 14. Generally, the process 168 includes determining a target operation to be performed by a deployment vehicle (process block 170), determining whether the target operation is a vehicle drive operation (decision block 172), and powering a drive sub-system using a fluid power sub-system when the target operation is a vehicle drive operation (process block 174). Additionally, the process 168 generally includes determining whether the target operation is a fitting swage operation (decision block 176) and powering a swage machine using the fluid power sub-system when the target operation is a fitting swage operation (process block 178).

Although described in a specific order, which corresponds with an embodiment of the present disclosure, it should be appreciated that the example process 168 is merely intended to be illustrative and not limiting. In particular, in other embodiments, a process 168 for operating a deployment system 38 integrated on one or more deployment vehicles 118 may include one or more additional process blocks and/or omit one or more of the depicted process blocks. Additionally or alternatively, in other embodiments, one or more of the depicted process blocks may be performed in a different order, for example, such that whether a target operation is a fitting swage operation is determined before determination of whether the target operation is a vehicle drive operation. Moreover, in some embodiments, the process 168 may be performed at least in part by executing instructions stored in a tangible, non-transitory, computer-readable medium, such as memory 54 in a control sub-system 48, using processing circuitry, such as a processor 52 in the control sub-system 48.

For example, in some such embodiments, a control sub-system 48 of an integrated deployment system 38 may determine a target operation to be performed by one or more deployment vehicles 118 on which it is integrated (process block 170). In particular, in some embodiments, the control sub-system 48 may autonomously determine the target operation to be performed by a deployment vehicle 118, for example, at least in part by executing instructions and/or processing sensor data stored in memory 54 of the control sub-system 48. Additionally or alternatively, the control sub-system 48 may determine the target operation to be performed by a deployment vehicle 118 based at least in part on one or more user inputs, for example, received from a user (e.g., operator), such as a service technician, via one or more I/O devices 56 of the control sub-system 48.

In any case, the control sub-system 48 may then determine whether the target operation to be performed by the one or more deployment vehicles 118 is a vehicle drive operation, for example, which targets moving a deployment vehicle 118 forward, moving a deployment vehicle 118 backward, and/or turning a deployment vehicle 118 (decision block 172). When the target operation is a vehicle drive operation, the control sub-system 48 may instruct a fluid (e.g., hydraulic and/or pneumatic) power sub-system 46 to power a drive sub-system 122 that is integrated on a deployment vehicle 118 in the integrated deployment system 38 (process block 174). As described above, one or more wheels 124 in a drive sub-system 122 of a deployment vehicle 118 may be tied to a drive gear 134 and, thus, actuating the drive gear 134 may cause the deployment vehicle 118 to move, thereby facilitating performance of a vehicle drive operation.

To facilitate selectively actuating the drive gear 134 of an integrated deployment system 38 using its fluid power sub-system 46, as described above, a switching device 132 may be coupled between the fluid power sub-system 46 and a drive sub-system 122 of the integrated deployment system 38. In particular, as described above, in some embodiments, the switching device 132 may be a transmission (e.g., clutch and gearbox), which is implemented and/or operated to enable the fluid power sub-system 46 to selectively power the drive sub-system 122 at least in part by interlocking the motor shaft of one or more motors 62 in the fluid power sub-system 46 with the drive gear 134 tied to one or more wheels 124 in the drive sub-system 122. In other words, in such embodiments, powering the drive sub-system 122 using the fluid power sub-system 46 may include instructing a switching device (e.g., transmission) 132 to interlock the motor shaft of one or more motors 62 in the fluid power sub-system 46 with the drive gear 134 to enable the one or more motors 62 to actuate the drive gear 134 and, thus, one or more wheels 124 in the drive sub-system 122 that are tied to the drive gear 134 (process block 180).

In other embodiments, as described above, the switching device 132 coupled between a fluid power sub-system 46 and a drive sub-system 122 of an integrated deployment system 38 may be a directional control valve (DCV), which is implemented and/or operated to selectively provide a fluid flow path between one or more fluid pumps 64 in the fluid power sub-system 46 and a drive gear 134 that is tied to one or more wheels 124 in the drive sub-system 122. In other words, in such embodiments, powering the drive sub-system 122 using the fluid power sub-system 46 may include instructing a switching device (e.g., directional control valve) 132 to provide a fluid flow path between one or more fluid pumps 64 in the fluid power sub-system 46 and the drive gear 134 to enable an actuation fluid flow produced by the one or more fluid pumps 64 to actuate the drive gear 134 and, thus, one or more wheels 124 in the drive sub-system 122 that are tied to the drive gear 134 (process block 182). In fact, to facilitate improving efficiency with which a vehicle drive operation is performed, in some embodiments, the control sub-system 48 may at least in part autonomously control operation of one or more deployment vehicles 118 based on one or more operational parameters determined by one or more sensors 50 in the integrated deployment system 38, for example, with no or minimal user intervention.

Figure 15:
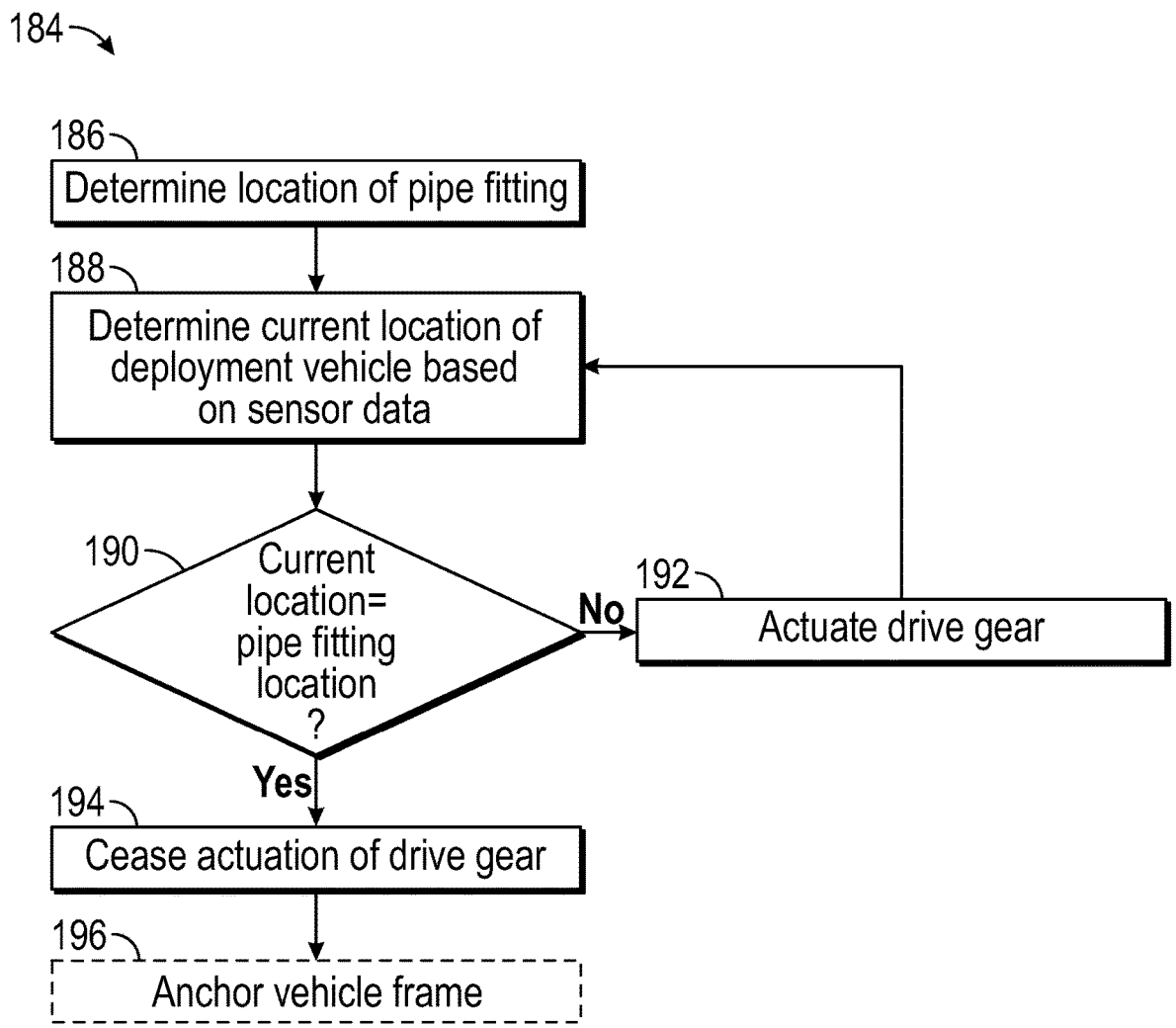
FIG. 15 is a flow diagram of an example process for performing a vehicle drive operation using an integrated deployment system, in accordance with an embodiment of the present disclosure.

To help illustrate, an example of a process 184 for performing a vehicle drive operation is described in FIG. 15. Generally, the process 184 includes determining a location of a pipe fitting (process block 186), determining a current location of a deployment vehicle based on sensor data (process block 188), and determining whether the current location of the deployment vehicle matches the location of the pipe fitting (decision block 190). Additionally, the process 184 generally includes actuating a drive gear when the current location of the deployment vehicle does not match the location of the pipe fitting (process block 192) and ceasing actuation of the drive gear when the current location of the deployment vehicle matches the location of the pipe fitting (process block 194).

Although described in a specific order, which corresponds with an embodiment of the present disclosure, it should be appreciated that the example process 184 is merely intended to be illustrative and not limiting. In particular, in other embodiments, a process 184 for performing a vehicle drive operation may include one or more additional process blocks and/or omit one or more of the depicted process blocks. For example, some embodiments of the process 184 may additionally include anchoring a vehicle frame (process block 196) while other embodiments of the process 184 do not. Additionally or alternatively, in other embodiments, one or more of the depicted process blocks may be performed in a different order, for example, such that current location of the deployment vehicle 118 is determined before determination of the location of the pipe fitting 18. Moreover, in some embodiments, the process 168 may be performed at least in part by executing instructions stored in a tangible, non-transitory, computer-readable medium, such as memory 54 in a control sub-system 48, using processing circuitry, such as a processor 52 in the control sub-system 48.

For example, in some such embodiments, a control sub-system 48 of an integrated deployment system 38 may determine the location of a pipe fitting 18 that is to be swaged using a deployment vehicle 118 in the integrated deployment system 38 (process block 186). In other words, the control sub-system 48 may determine a target location at which a swage machine 40 integrated on the deployment vehicle 118 is to be operated. In some embodiments, the control sub-system 48 may autonomously determine the location at which the pipe fitting 18 is to be deployed in a pipeline system 10, for example, at least in part by analyzing a deployment map for the pipeline system 10. Additionally or alternatively, the control sub-system 48 may determine the location at which pipe fitting 18 is to be deployed based at least in part on one or more user inputs, for example, received via one or more I/O devices 56 of the control sub-system 48.

The control sub-system 48 may also determine a current location of the deployment vehicle 118 based at least in part on sensor data received from one or more sensors 50 in the integrated deployment system 38 (process block 188). As described above, a sensor 50 in the integrated deployment system 38 may be implemented and/or operated to determine (e.g., sense and/or measure) sensor data indicative of one or more operational parameters of the integrated deployment system 38. For example, a vehicle location sensor 50 may determine sensor data indicative of the location of a deployment vehicle 118 in the deployment system 38. Additionally, as described above, a sensor 50 may be communicatively coupled to the control sub-system 48 to enable the sensor 50 to transmit one or more sensor signals 58 indicative of sensor data and, thus, one or more corresponding operational parameters of the integrated deployment system 38 to the control sub-system 48. In other words, in some embodiments, the control sub-system 48 may determine the current location of the deployment vehicle 118 based at least in part on sensor data received from the vehicle location sensor 50, for example, via one or more I/O devices 56 of the control sub-system 48.

When the current location of the deployment vehicle 118 does not match the location of the pipe fitting 18 to be swaged using the swage machine 40 integrated on the deployment vehicle 118, the control sub-system 48 may instruct the integrated deployment system 38 to actuate the drive gear 134 that is tied to one or more wheel 124 in its drive sub-system 122 (process block 192). As described above, to enable actuating the drive gear 134 using a fluid (e.g., hydraulic and/or pneumatic) power sub-system 46, in some embodiments, the control sub-system 48 may instruct a switching device (e.g., transmission) 132 to interlock a motor shaft, which is tied to one or more motors 62 in the fluid power sub-system 46, with the drive gear 134. In other embodiments, as described above, to enable actuating the drive gear 134 using a fluid power sub-system 46, the control sub-system 48 may instruct a switching device (e.g., directional control valve) 132 to provide a fluid flow path between one or more fluid pumps 64 in the fluid power sub-system 46 and the drive gear 134.

On the other hand, when the current location of the deployment vehicle 118 matches the location of the pipe fitting 18 to be swaged by the swage machine 40 integrated on the deployment vehicle 118, the control sub-system 48 may instruct the integrated deployment system 38 to cease actuation of its drive gear 134 (process block 194). In particular, to facilitate ceasing actuation of the drive gear 134, in some embodiments, the control sub-system 48 may instruct a switching device (e.g., transmission) 132 to disengage a motor shaft, which is tied to one or more motors 62 in the fluid power sub-system 46, from the drive gear 134. In other embodiments, to facilitate ceasing actuation of the drive gear 134, the control sub-system 48 may instruct a switching device 132 to block (e.g., break) a fluid flow path between one or more fluid pumps 64 in the fluid power sub-system 46 and the drive gear 134.

To facilitate reducing the likelihood of the deployment vehicle 118 inadvertently moving relative to the pipe fitting 18, in some embodiments, the vehicle frame 120 of the deployment vehicle 118 may be anchored in place (process block 196). For example, in some such embodiments, the vehicle frame 120 may be anchored at least in part by securing one or more anchoring cables to the vehicle frame 120 as well as to the ground proximate the deployment vehicle 118. In any case, in this manner, one or more deployment vehicles 118 on which a deployment system 38 is integrated may be operated to relatively autonomously perform a vehicle drive operation based at least in part on sensor data, which, at least in some instances, may facilitate improving operational efficiency of the one or more deployment vehicles 118, for example, at least in part by enabling a reduction of user intervention in operation of the one or more deployment vehicles 118 and, thus, the integrated deployment system 38.

Returning to the process 168 of FIG. 14, the control sub-system 48 may additionally determine whether the target operation to be performed by the one or more deployment vehicles 118 in the integrated deployment system 38 is a fitting swage operation (decision block 176). When the target operation is a fitting swage operation, the control sub-system 48 may instruct the fluid (e.g., hydraulic and/or pneumatic) power sub-system 46 to power a swage machine 40 that is integrated on a deployment vehicle 118 of the integrated deployment system 38 (process block 178). As described above, a swaging fluid actuator 90 in the swage machine 40 may be fluidly coupled to one or more fluid pumps 64 in the fluid power sub-system 46 and, thus, supplying actuation fluid to and/or extracting actuation fluid from the swaging fluid actuator 90 may cause the swage machine 40 to move its die 42 and a pipe fitting 18 secured thereto in an axial direction relative to one another, thereby facilitating performance of a fitting swage operation.

To facilitate selectively actuating a swage machine 40 of an integrated deployment system 38 using its fluid power sub-system 46, as described above, a switching device 132 may be coupled between the swage machine 40 and the fluid power sub-system 46. In particular, as described above, in some embodiments, the switching device 132 may be a transmission (e.g., clutch and gearbox), which is implemented and/or operated to enable the fluid power sub-system 46 to selectively power the drive sub-system 122 at least in part by interlocking the motor shaft of one or more motors 62 in the fluid power sub-system 46 with a pump gear 136, which is tied to one or more fluid pumps 64 in the fluid power sub-system 46. In other words, in such embodiments, powering the swage machine 40 using the fluid power sub-system 46 may include instructing a switching device (e.g., transmission) 132 to interlock the motor shaft of one or more motors 62 in the fluid power sub-system 46 with the pump gear 136 to enable the one or more motors 62 to actuate the one or more fluid pumps 64 and, thus, a resulting flow of actuation fluid to actuate one or more swaging fluid actuators 90 in the swage machine 40 (process block 198).

In other embodiments, as described above, the switching device 132 coupled between a fluid power sub-system 46 and a swage machine 40 of an integrated deployment system 38 may be a directional control valve (DCV), which is implemented and/or operated to selectively provide a fluid flow path between one or more fluid pumps 64 in the fluid power sub-system 46 and one or more swaging fluid actuators 90 in the swage machine 40 via one or more corresponding actuator fluid ports 138. In other words, in such embodiments, powering the swage machine 40 using the fluid power sub-system 46 may include routing an actuation fluid flow produced by the one or more fluid pumps 64 to an actuator fluid port 138, which is fluidly coupled to one or more swaging fluid actuators 90 in the swage machine 40 via one or more corresponding actuation fluid conduits 68 (process block 200). In fact, to facilitate improving efficiency with which a fitting swage operation is performed, in some embodiments, the control sub-system 48 may at least in part autonomously control operation of the deployment vehicle 118 based on one or more operational parameters determined by one or more sensors 50 in the integrated deployment system 38, for example, with no or minimal user intervention.

Figure 16:
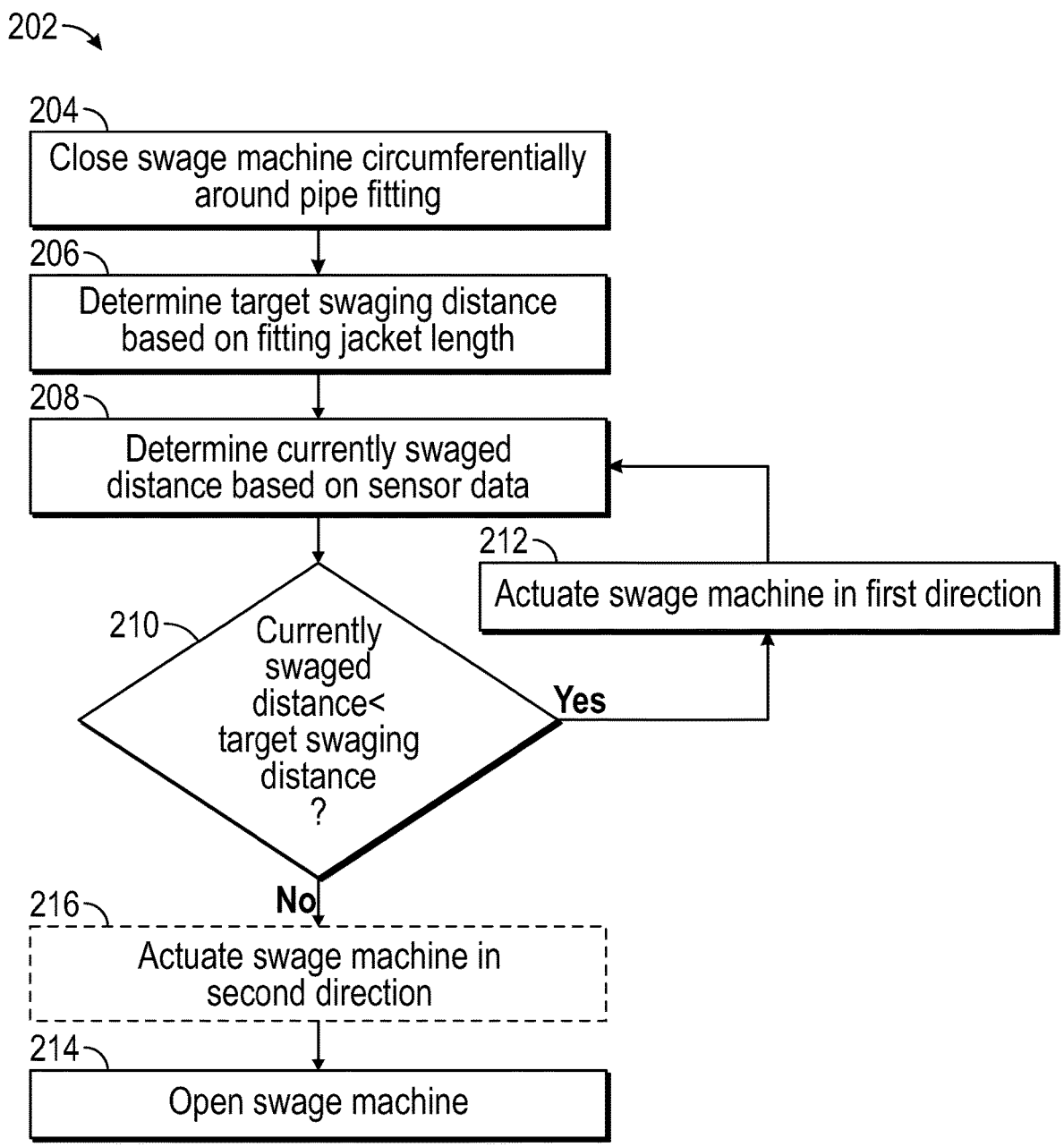
FIG. 16 is a flow diagram of an example process for performing a fitting swage operation using an integrated deployment system, in accordance with an embodiment of the present disclosure.

To help illustrate, an example of a process 202 for performing a fitting swage operation is described in FIG. 16. Generally, the process 202 includes closing a swage machine circumferentially around a pipe fitting (process block 204), determining a target swaging distance based on fitting jacket length (process block 206), and determining a currently swaged distance based on sensor data (process block 208). Additionally, the process 202 generally includes determining whether the currently swaged distance is less than the target swaging distance (decision block 210), actuating the swage machine in a first direction when the currently swaged distance is less than the target swaging distance (process block 212), and opening the swage machine when the currently swaged distance is not less than the target swaging distance (process block 214).

Although described in a specific order, which corresponds with an embodiment of the present disclosure, it should be appreciated that the example process 202 is merely intended to be illustrative and not limiting. In particular, in other embodiments, a process 202 for performing a fitting swage operation may include one or more additional process blocks and/or omit one or more of the depicted process blocks. For example, some embodiments of the process 202 may additionally include actuating the swage machine 40 in a second (e.g., opposite) direction when the currently swage distance is not less than the target swaging distance (process block 216) while other embodiments of the process 202 do not. Additionally or alternatively, in other embodiments, one or more of the depicted process blocks may be performed in a different order, for example, such that the target swaging distance and/or the currently swaged distance are determined before the swage machine 40 is closed circumferentially around the pipe fitting 18. Moreover, in some embodiments, the process 202 may be performed at least in part by executing instructions stored in a tangible, non-transitory, computer-readable medium, such as memory 54 in a control sub-system 48, using processing circuitry, such as a processor 52 in the control sub-system 48.

For example, in some such embodiments, a control sub-system 48 of an integrated deployment system 38 may instruct a deployment vehicle 118 on which a swage machine 40 is integrated to close the swage machine 40 circumferentially around a pipe fitting 18 (process block 204). In other words, in such embodiments, the control sub-system 48 may instruct the deployment vehicle 118 to transition the swage machine 40 from its opened state, which enables the pipe fitting 18 to be laid in the swage machine 40, to its closed state, which facilitates securing the swage machine 40 to the pipe fitting 18. In particular, to facilitate securing the swage machine 40 to the pipe fitting 18, as described above, the swage machine 40 may be transitioned to the closed state once a grab tab 96 implemented on the swage machine 40 is aligned with a grab notch 98 implemented on the pipe fitting 18, thereby enabling the grab tab 96 to matingly interlock with the grab notch 98 while the swage machine 40 is in the closed state.

To enable a swage machine 40 to transition (e.g., switch) between its opened state and its closed state, as described above, in some embodiments, the swage machine 40 may include a base portion 108, a first side portion 104 rotatably coupled to the base portion 108, a first clamping fluid (e.g., hydraulic and/or pneumatic) actuator 110A coupled between the base portion 108 and the first side portion 104, a second side portion 106 rotatably coupled to the base portion 108, and a second clamping fluid actuator 110B coupled between the base portion 108 and the second side portion 106. In particular, in such embodiments, a clamping fluid actuator 110 may contract to facilitate transitioning a corresponding side portion of the swage machine 40 toward its opened position, which corresponds with the opened state of the swage machine 40. On the other hand, in such embodiments, the clamping fluid actuator 110 may extend to facilitate transitioning the corresponding side portion of the swage machine 40 toward its closed position, which corresponds with the closed state of the swage machine 40.

To facilitate reducing the likelihood of a swage machine 40 inadvertently transitioning from its closed state, as described above, in some embodiments, a pinning fluid actuator 114 of the swage machine 40 may include a pinning actuator piston 116, which is implemented to be inserted in a fluidly actuated pin opening in the first side portion 104 of the swage machine 40 as well as a corresponding fluidly actuated pin opening in the second side portion 106 of the swage machine 40. In particular, in such embodiments, the fluidly actuated pin openings in the first side portion 104 and the second side portion 106 of the swage machine 40 may be aligned when the swage machine 40 is in its closed state. Thus, in such embodiments, withdrawing the pinning actuator piston 116 from the fluidly actuated pin openings may enable the swage machine 40 to be transitioned away from its closed state while inserting the pinning actuator piston 116 in the fluidly actuated pin openings may facilitate blocking the swage machine 40 from inadvertently being transitioned from its closed state.

Moreover, to facilitate reducing the likelihood of a swage machine 40 inadvertently transitioning from its closed state, as described above, in some embodiments, the swage machine 40 may additionally or alternatively include a manual pin 112, which is implemented to be inserted in a manual pin opening in the first side portion 104 of the swage machine 40 as well as a corresponding manual pin opening in the second side portion 106 of the swage machine 40. In particular, in such embodiments, the manually pin openings in the first side portion 104 and the second side portion 106 of the swage machine 40 may be aligned when the swage machine 40 is in its closed state. Thus, in such embodiments, withdrawing the manual pin 112 from the manual pin openings may enable the swage machine 40 to be transitioned away from its closed state while inserting the manual pin in the manual pin openings may facilitate blocking the swage machine 40 from inadvertently being transitioned from its closed state. Furthermore, in some embodiments, a swage machine 40 may additionally or alternatively be manually transitioned between its opened state and its closed state, for example, by a user (e.g., operator), such as a service technician.

In any case, to facilitate securing a pipe fitting 18 to a pipe segment 20 in a pipeline system 10, as described above, a swage machine 40 may be operated to conformally deform a fitting jacket 76 of the pipe fitting 18 around the tubing 22 of the pipe segment 20. In other words, the swage machine 40 may be operated to swage the fitting jacket 76 of the pipe fitting 18 and, thus, the control sub-system 48 may determine a target swaging distance based at least in part on the length of the fitting jacket 76 (process block 206). In particular, in some embodiments, the control sub-system 48 may autonomously determine the length of the fitting jacket 76 and, thus, the target swaging distance, for example, at least in part by analyzing a deployment map for the pipeline system 10. Additionally or alternatively, the control sub-system 48 may determine the length of the fitting jacket 76 and, thus, the target swaging distance based at least in part on one or more user inputs, for example, received via one or more I/O devices 56 of the control sub-system 48.

The control sub-system 48 may also determine a currently swaged distance on the pipe fitting 18 based at least in part on sensor data received from one or more sensors 50 in the integrated deployment system 38 (process block 208). As described above, a sensor 50 in the integrated deployment system 38 may be implemented and/or operated to determine (e.g., sense and/or measure) sensor data indicative of one or more operational parameters of the integrated deployment system 38. For example, a die position sensor 50 may determine sensor data indicative of the position of a die 42 in a swage machine 40 relative to a pipe fitting 18 secured to the swage machine 40. Additionally, as described above, the sensor 50 may be communicatively coupled to the control sub-system 48 to enable the sensor 50 to transmit one or more sensor signals 58 indicative of sensor data and, thus, one or more corresponding operational parameters of the integrated deployment system 38 to the control sub-system 48. In other words, in some embodiments, the control sub-system 48 may determine the currently swaged distance at least in part by monitoring the sensor data received from the die position sensor 50 over time.

When the currently swaged distance on the pipe fitting 18 is less than the target swaging distance, the control sub-system 48 may instruct the integrated deployment system 38 to actuate the swage machine 40 in a first direction (process block 212). As described above, to enable actuating a swage machine 40 using a fluid (e.g., hydraulic and/or pneumatic) power sub-system 46, in some embodiments, the control sub-system 48 may instruct a switching device (e.g., transmission) 132 to interlock a motor shaft, which is tied to one or more motors 62 in the fluid power sub-system 46, with a pump gear 136, which is tied to one or more fluid pumps 64 in the fluid power sub-system 46. In other embodiments, as described above, to enable actuating the swage machine 40 using a fluid power sub-system 46, the control sub-system 48 may instruct a switching device (e.g., directional control valve) 132 to provide a fluid flow path between one or more fluid pumps 64 in the fluid power sub-system 46 and one or more actuator fluid ports 138, which are fluidly coupled to one or more swaging fluid actuators 90 in the swage machine 40.

On the other hand, when the currently swaged distance on the pipe fitting 18 is not less than the target swaging distance, the control sub-system 48 may instruct the integrated deployment system 38 to open the swage machine 40 (process block 214). In other words, in such embodiments, the control sub-system 48 may instruct the integrated deployment system 38 to transition the swage machine 40 from its closed state to its opened state to enable the pipe fitting 18 to be removed from within the swage machine 40. In other embodiments, the swage machine 40 may additionally or alternatively be manually transitioned from its closed state to its opened state, for example, by a user (e.g., operator), such as a service technician.

Since the swage machine 40 is actuated in the first direction to swage the pipe fitting 18, in some embodiments, when the currently swaged distance on the pipe fitting 18 is no longer less than the target swaging distance, the swage machine 40 may be actuated in a second (e.g., opposite) direction, for example, to facilitate resetting the swage machine 40 for performance of another fitting swage operation (process block 216). In particular, in some such embodiments, the control sub-system 48 may instruct the integrated deployment system 38 to actuate the swage machine 40 in the second direction. Additionally or alternatively, the swage machine 40 may be manually actuated in the second direction, for example, by a user (e.g., operator), such as a service technician. In any case, in this manner, one or more deployment vehicles 118 on which a deployment system 38 is integrated may be operated to relatively autonomously perform a fitting swage operation based at least in part on sensor data, which, at least in some instances, may facilitate improving operational efficiency of the one or more deployment vehicles 118, for example, at least in part by enabling a reduction of user intervention in operation of the one or more deployment vehicles 118 and, thus, the integrated deployment system 38.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline deployment system comprising:
a deployment vehicle, wherein the deployment vehicle comprises a vehicle frame;
a drive sub-system, wherein the drive sub-system comprises one or more wheels secured to the vehicle frame of the deployment vehicle;
a swage machine, wherein the swage machine comprises:
a grab plate configured to interlock with a pipe fitting;
a die plate configured to enable a die to be loaded in the swage machine; and
a fluid actuator secured to the grab plate and the die plate, wherein the fluid actuator is configured to cause the die plate of the swage machine to move over a fitting jacket of the pipe fitting to facilitate securing the pipe fitting to a pipe segment;
a fluid power sub-system, wherein the pipeline deployment system is configured to selectively switch between using the fluid power sub-system to drive rotation of the one or more wheels in the drive sub-system to facilitate moving the deployment vehicle along a ground surface and using the fluid power sub-system to power operation of the fluid actuator in swage machine to facilitate securing the pipe fitting to the pipe segment based at least in part on a target operation to be performed by the pipeline deployment system; and
a directional control valve, wherein the directional control valve is configured to:
provide a first flow path between a fluid pump in the fluid power sub-system and a drive gear that is tied to the one or more wheels in the drive sub-system when the target operation to be performed by the pipeline deployment system is a vehicle drive operation; and
provide a second flow path between the fluid pump in the fluid power sub-system and the fluid actuator in the swage machine when the target operation to be performed by the pipeline deployment system is a fitting swage operation.

2. The pipeline deployment system of claim 1, wherein the pipeline deployment system is configured to:
switch from using the fluid power sub-system to power operation of the fluid actuator in the swage machine to using the fluid power sub-system to drive rotation of the one or more wheels in the drive sub-system when the target operation to be performed by the pipeline deployment system changes from a fitting swage operation to a vehicle drive operation; and
switch from using the fluid power sub-system to drive rotation of the one or more wheels in the drive sub-system to using the fluid power sub-system to power operation of the fluid actuator in the swage machine when the target operation to be performed by the pipeline deployment system changes from the vehicle drive operation to the fitting swage operation.

3. The pipeline deployment system of claim 1, comprising:
a vehicle location sensor configured to determine sensor data indicative of a current location of the deployment vehicle; and
a control sub-system communicatively coupled to the vehicle location sensor, wherein, when the target operation to be performed by the pipeline deployment system is a vehicle drive operation, the control sub-system is configured to:
determine the current location of the deployment vehicle based at least in part on the sensor data received from the vehicle location sensor;
determine a location of the pipe fitting to be secured to the pipe segment using the swage machine;
instruct the pipeline deployment system to continue driving rotation of the one or more wheels in the drive sub-system using the fluid power sub-system when the current location of the deployment vehicle does not match the location of the pipe fitting; and
instruct the pipeline deployment system to cease driving rotation of the one or more wheels in the drive sub-system using the fluid power sub-system when the current location of the deployment vehicle matches the location of the pipe fitting.

4. The pipeline deployment system of claim 1, comprising:
a die position sensor configured to determine sensor data indicative of a current position of the die plate in the swage machine relative to the pipe fitting; and
a control sub-system communicatively coupled to the die position sensor, wherein, when the target operation to be performed by the pipeline deployment system is a fitting swage operation, the control sub-system is configured to:
determine a currently swaged distance on the pipe fitting based at least in part on the sensor data received from the die position sensor;
determine a target swaging distance on the pipe fitting based at least in part on length of the fitting jacket in the pipe fitting;
instruct the pipeline deployment system to continue powering operation of the fluid actuator in the swage machine using the fluid power sub-system when the currently swaged distance on the pipe fitting is less than the target swaging distance on the pipe fitting; and
instruct the pipeline deployment system to cease powering operation of the fluid actuator in the swage machine using the fluid power sub-system when the currently swaged distance on the pipe fitting is not less than the target swaging distance on the pipe fitting.

5. A method of operating a pipeline deployment system, comprising:
determining, using a control sub-system, a target operation to be performed by the pipeline deployment system, wherein the pipeline deployment system comprises a transmission, a drive sub-system having one or more wheels that are to be used to move a deployment vehicle in the pipeline deployment system along a ground surface, a swage machine that is to be used to swage a pipe fitting around a pipe segment, and a fluid power sub-system;
instructing, using the control sub-system, the pipeline deployment system to drive rotation of the one or more wheels in the drive sub-system using the fluid power sub-system to facilitate moving the deployment vehicle along the ground surface in response to determining that the target operation to be performed by the pipeline deployment system is a vehicle drive operation at least in part by instructing the transmission to connect a motor shaft in the fluid power sub-system to a drive gear that is tied to the one or more wheels in the drive sub-system; and instructing, using the control sub-system, the pipeline deployment system to switch from using the fluid power sub-system to drive rotation of the one or more wheels in the drive sub-system to using the fluid power sub-system to power operation of the swage machine to facilitate swaging the pipe fitting around the pipe segment in response to determining that the target operation to be performed by the pipeline deployment system switches from the vehicle drive operation to a fitting swage operation at least in part by:

instructing the transmission to disconnect the motor shaft in the fluid power sub-system from the drive gear that is tied to the one or more wheels in the drive sub-system; and instructing the transmission to connect the motor shaft to a pump gear that is tied to a fluid pump in the fluid power sub-system, wherein the fluid pump in the fluid power sub-system is fluidly connected to a fluid actuator in the swage machine.

6. The method of claim 5, wherein instructing the pipeline deployment system to drive rotation of the one or more wheels in the drive sub-system using the fluid power sub-system comprises:

determining a current location of the deployment vehicle based at least in part on sensor data received from a vehicle location sensor;

determining location of the pipe fitting to be swaged around the pipe segment tubing using the swage machine;

instructing the pipeline deployment system to continue driving rotation of the one or more wheels in the drive sub-system using the fluid power sub-system in response to determining that the current location of the deployment vehicle does not match the location of the pipe fitting; and instructing the pipeline deployment system to cease driving rotation of the one or more wheels in the drive sub-system using the fluid power sub-system in response to determining that the current location of the deployment vehicle matches the location of the pipe fitting.

7. The method of claim 5, wherein instructing the pipeline deployment system to switch from using the fluid power sub-system to drive rotation of the one or more wheels in the drive sub-system to using the fluid power sub-system to power operation of the swage machine comprises:

determining a currently swaged distance on the pipe fitting based at least in part on sensor data that is indicative of a current position of a die plate in the swage machine;

determining a target swaging distance on the pipe fitting based at least in part on length of a fitting jacket on the pipe fitting that is to be swaged around the pipe segment tubing;

instructing the pipeline deployment system to continue powering operation of the swage machine using the fluid power sub-system in response to determining that currently swaged distance on the pipe fitting is less than the target swaging distance on the pipe fitting; and instructing the pipeline deployment system to cease powering operation of the swage machine using the fluid power sub-system in response to determining that the currently swaged distance on the pipe fitting is not less than the target swaging distance on the pipe fitting.

8. A pipeline deployment system comprising:

a drive sub-system, wherein the drive sub-system comprises one or more wheels configured to be secured to a vehicle frame of a deployment vehicle in the pipeline deployment system to facilitate moving the deployment vehicle along a ground surface and a drive gear tied to the one or more wheels;

a swage machine, wherein the swage machine comprises a die plate and a fluid actuator configured to move the die plate over a fitting jacket of a pipe fitting to facilitate securing the pipe fitting to a pipe segment;

a fluid power sub-system, wherein the fluid power sub-system comprises a fluid pump, a motor shaft, and a pump gear that is tied to the fluid pump, wherein the fluid pump is fluidly connected to the fluid actuator in the swage machine via one or more fluid conduits; and a transmission coupled between the drive sub-system and the fluid power sub-system, wherein the transmission is configured to:

enable the fluid power sub-system to drive rotation of the one or more wheels in the drive sub-system to facilitate moving the deployment vehicle along the ground surface at least in part by connecting the motor shaft in the fluid power sub-system to the drive gear in the drive sub-system when a target operation to be performed by the pipeline deployment system is a vehicle drive operation; and enable the fluid power sub-system to power operation of the swage machine to facilitate securing the pipe fitting to the pipe segment at least in part by connecting the motor shaft to the pump gear in the fluid power sub-system when the target operation to be performed by the pipeline deployment system is a fitting swage operation.

9. The pipeline deployment system of claim 8, wherein the swage machine comprises a grab plate having a grab tab that is configured to matingly interlock with a grab notch on the pipe fitting to facilitate securing the swage machine to the pipe fitting.

10. The pipeline deployment system of claim 8, comprising:

a vehicle location sensor configured to determine sensor data indicative of a current location of the deployment vehicle; and a control sub-system communicatively coupled to the vehicle location sensor and the transmission, wherein, when the target operation to be performed by the pipeline deployment system is the vehicle drive operation, the control sub-system is configured to:

determine the current location of the deployment vehicle based at least in part on the sensor data received from the vehicle location sensor;

determine a location of the pipe fitting to be secured to the pipe segment using the swage machine;

instruct the transmission to continue enabling the fluid power sub-system to drive rotation of the one or more wheels in the drive sub-system when the current location of the deployment vehicle does not match the location of the pipe fitting; and instruct the transmission to cease enabling the fluid power sub-system to drive rotation of the one or more wheels in the drive sub-system when the current location of the deployment vehicle matches the location of the pipe fitting.

11. The pipeline deployment system of claim 8, comprising:
- a die position sensor configured to determine sensor data indicative of a current position of the die plate in the swage machine relative to the pipe fitting; and
- a control sub-system communicatively coupled to the die position sensor and the transmission, wherein, when the target operation to be performed by the pipeline deployment system is the fitting swage operation, the control sub-system is configured to:
  - determine a currently swaged distance on the pipe fitting based at least in part on the sensor data received from the die position sensor;
  - determine a target swaging distance on the pipe fitting based at least in part on length of the fitting jacket on the pipe fitting;
  - instruct the transmission to continue enabling the fluid power sub-system to power operation of the swage machine when the currently swaged distance on the pipe fitting is less than the target swaging distance on the pipe fitting; and
  - instruct the transmission to cease enabling the fluid power sub-system to power operation of the swage machine when the currently swaged distance on the pipe fitting is not less than the target swaging distance on the pipe fitting.

12. The pipeline deployment system of claim 8, comprising a control sub-system configured to autonomously control operation of the pipeline deployment system with no user intervention.

13. The pipeline deployment system of claim 8, wherein the drive sub-system comprises a track disposed around the one or more wheels in the drive sub-system.

14. The pipeline deployment system of claim 8, wherein:
- the fluid power sub-system is disposed on the deployment vehicle in the pipeline deployment system and the swage machine is disposed on a different deployment vehicle in the pipeline deployment system; or
- the swage machine is disposed on the deployment vehicle in the pipeline deployment system and the fluid power sub-system is disposed on the different deployment vehicle in the pipeline deployment system.

* * * * *